(12) United States Patent
Harvey et al.

(10) Patent No.: US 7,735,060 B2
(45) Date of Patent: Jun. 8, 2010

(54) METHOD AND SYSTEM FOR RAPIDLY DEVELOPING AND DEPLOYING SENSOR-ENABLED SOFTWARE APPLICATIONS

(75) Inventors: Clint M. Harvey, Morgantown, WV (US); John E. Moody, Morgantown, WV (US); Jackie P. Williams, II, Fairmont, WV (US); Patrick R. Esposito, II, Morgantown, WV (US); George K. Thomas, Friendsville, MD (US); Jared K. Reed, Morgantown, WV (US); Brian J. Kesecker, II, Farimont, WV (US); Patrick R. Esposito, Morgantown, WV (US)

(73) Assignee: Augusta Systems, Inc., Morgantown, WV (US)

( * ) Notice: Subject to any disclaimer, the term of this patent is extended or adjusted under 35 U.S.C. 154(b) by 221 days.

(21) Appl. No.: 11/683,761

(22) Filed: Mar. 8, 2007

(65) Prior Publication Data
US 2008/0005729 A1 Jan. 3, 2008

Related U.S. Application Data

(63) Continuation-in-part of application No. 11/674,893, filed on Feb. 14, 2007, and a continuation-in-part of application No. 11/478,085, filed on Jun. 29, 2006.

(51) Int. Cl.
*G06F 9/44* (2006.01)
*G06F 9/445* (2006.01)
*G06F 11/00* (2006.01)

(52) U.S. Cl. .................. 717/107; 717/130; 717/175; 717/177; 717/178; 714/38

(58) Field of Classification Search ................... None
See application file for complete search history.

(56) References Cited

U.S. PATENT DOCUMENTS 4,864,497 A 9/1989 Lowry (Continued)

OTHER PUBLICATIONS

"Towards an architectural approach for the dynamic and automatic composition of software components", Bucchiarone et al., Jul. 2006, pp. 12-21, <http://delivery.acm.org/10.1145/1150000/1147251/p12-bucchiarone.pdf>.*

(Continued)

*Primary Examiner*—Tuan Q Dam
*Assistant Examiner*—Thuy Dao
(74) *Attorney, Agent, or Firm*—Coats & Bennett, P.L.L.C.

(57) ABSTRACT

A system for deploying component-based software systems for the implementation of desired sensor data process flows makes use of a toolset of software components specially tailored for building sensor data process flows. In one or more embodiments, the system comprises a front-end application operative to generate system specifications from user input, each system specification defining a desired component-based software system of one or more sensor components and their corresponding configurations in accordance with sensor component class definitions (e.g., the toolset) for a predefined set of sensor components tailored for building desired sensor data process flows. The system further includes a back-end application operative to store the sensor component class definitions for use in instantiating sensor components as needed, receive system specifications, and dynamically build and run the corresponding desired component-based software systems within a run-time environment provided by the back-end application.

33 Claims, 12 Drawing Sheets

U.S. PATENT DOCUMENTS

| | | | |
|---|---|---|---|
| 6,633,878 B1 | 10/2003 | Underwood | |
| 6,636,242 B2 | 10/2003 | Bowman-Amuah | |
| 6,738,975 B1 | 5/2004 | Yee et al. | |
| 6,836,890 B1 | 12/2004 | Watts, Jr. et al. | |
| 6,948,150 B1 | 9/2005 | Pepin | |
| 6,950,823 B2 | 9/2005 | Amiri | |
| 6,975,914 B2 | 12/2005 | DeRemer | |
| 6,980,962 B1 | 12/2005 | Arganbright | |
| 7,012,706 B1 | 3/2006 | Hansen | |
| 2002/0053070 A1 | 5/2002 | Seki | |
| 2003/0005179 A1 | 1/2003 | Schmit | |
| 2003/0005180 A1 | 1/2003 | Schmit | |
| 2003/0009250 A1 | 1/2003 | Resnick | |
| 2003/0028579 A1 | 2/2003 | Kulkarni | |
| 2003/0084091 A1 | 5/2003 | Agarwalla | |
| 2003/0149960 A1* | 8/2003 | Inamdar | 717/118 |
| 2004/0001498 A1 | 1/2004 | Chen et al. | |
| 2004/0036719 A1 | 2/2004 | Van Treeck | |
| 2004/0045009 A1 | 3/2004 | Bryant | |
| 2004/0078137 A1 | 4/2004 | Breakfield | |
| 2004/0103073 A1 | 5/2004 | Blake | |
| 2004/0117393 A1 | 6/2004 | DeMesa | |
| 2004/0117798 A1 | 6/2004 | Newman | |
| 2004/0128370 A1 | 7/2004 | Kortright | |
| 2004/0158819 A1* | 8/2004 | Cuomo et al. | 717/128 |
| 2004/0187140 A1 | 9/2004 | Aigner et al. | |
| 2004/0268301 A1 | 12/2004 | Kaston | |
| 2004/0268312 A1 | 12/2004 | Abe | |
| 2005/0005262 A1 | 1/2005 | Mohan | |
| 2005/0015775 A1 | 1/2005 | Russell | |
| 2005/0055449 A1 | 3/2005 | Rappold | |
| 2005/0071850 A1 | 3/2005 | Ittel | |
| 2005/0080814 A1 | 4/2005 | Hailey | |
| 2005/0102652 A1 | 5/2005 | Sulm et al. | |
| 2005/0132294 A1 | 6/2005 | Dinger | |
| 2005/0149558 A1 | 7/2005 | Zhuk | |
| 2005/0160400 A1 | 7/2005 | Pepin | |
| 2005/0177818 A1 | 8/2005 | Huene | |
| 2005/0246716 A1 | 11/2005 | Smith | |
| 2005/0289124 A1 | 12/2005 | Kaiser | |
| 2006/0002387 A1 | 1/2006 | Lawrence | |
| 2006/0009944 A1 | 1/2006 | Shah | |
| 2006/0013458 A1 | 1/2006 | Debbins | |
| 2006/0036745 A1 | 2/2006 | Steinhans | |
| 2006/0047545 A1 | 3/2006 | Kumar | |
| 2006/0058987 A1 | 3/2006 | Kumar | |
| 2006/0059127 A1 | 3/2006 | Berry | |
| 2006/0064422 A1 | 3/2006 | Arthurs | |
| 2006/0064677 A1 | 3/2006 | Bickson | |
| 2006/0067209 A1 | 3/2006 | Sheehan | |
| 2006/0074736 A1 | 4/2006 | Shukla | |
| 2006/0075112 A1 | 4/2006 | Polozoff | |
| 2006/0092142 A1 | 5/2006 | Gillespie | |
| 2006/0106585 A1 | 5/2006 | Brown | |
| 2006/0111880 A1 | 5/2006 | Brown | |
| 2006/0117251 A1 | 6/2006 | Rothschiller | |
| 2006/0123010 A1 | 6/2006 | Landry | |
| 2006/0161909 A1 | 7/2006 | Pandey et al. | |
| 2006/0165040 A1 | 7/2006 | Rathod et al. | |

OTHER PUBLICATIONS

"Component-interaction automata as a verification-oriented component-based system specification", Brim et al., Mar. 2006, <http://delivery.acm.org/10.1145/1130000/1123063/p4-brim.pdf>.*

"A Constraint Architectural Description Approach to Self-Organising Component-Based Software Systems", P. Waewsawangwong, May 2004, pp. 81-83, <http://delivery.acm.org/10.1145/1000000/999414/21630081.pdf>.*

6NET.ORG. "Deliverable 2.2.3." Editor Tim Chown, University of Southampton, May 2004.

".NET Remoting." Definition from Wikipedia.com. Available at: http://en.wikipedia.org/wiki/.NET_Remoting.

"Recursion Software Extends .NET Compatibility to the JBoss Platform for Distributed and Mobile Networks." Recursion Software, Inc. Press Release. Available at: http://recursionsw.com/About_Us/inc/2007-6-19-VoyagerEdge_6-1_JBoss.pdf.

"D 1.8 Ambient Networking: Concepts and Architecture." Sixth Framework Programme, Priority IST-2002-2.3-1-4, Mobile and Wireless Systems beyond 3G, Project 507134, WWI Ambient Networks.

Gu, X. et al. "Adaptive Offloading for Pervasive Computing." IEEE Pervasive Computing, vol. 3, Issue 3, Jul.-Sep. 2004, pp. 66-73.

".NET Framework Remoting Overview." Microsoft Corporation 2007. Available at: http://msdn2.microsoft.com/en-us/library/kwdt6w2k.aspx.

Yocam, E. W. "Evolution on the Network Edge: Intelligent Devices." IT Professional, vol. 5, Issue 2, Mar./Apr. 2003, pp. 32-36.

Lekas, S. "Software Add-Ons; A Low-Cost, Powerful Solution for PC-Based Data Acquisition." Adapted from an article that appeared in ECN, Apr. 1996. Available at: http://www.iotech.com/ecnapr96.html.

Gu, X. et al. "An XML-based Quality of Service Enabling Language for the Web." Journal of Visual Languages & Computing, vol. 13, No. 1, Feb. 2002, pp. 61-95.

"PC-BOT 914 Components for Visual Studio 2005." White Box Robotics, May 12, 2007. Available at: http://whiteboxrobotics.com/PCBOTs/pdf/PC-BOT_dotNet_v1.0_documentation.pdf.

"0.0 Setting up the Visual Studio Environment with Phidgets.NET." Pervasive Computing, Lab Notes, Sep. 7, 2005. Available at: http://www.informatics.indiana.edu/yrogers/pervasive/downloads/InterfaceSkinTest.pdf.

Wong, W. "SDK Targets Emerging Robotics Market." Electronic Design (ED Online ID #13272), Sep. 1, 2006. Available at: http://electronicdesign.com/Articles/Index.cfm?AD=1&ArticleID=13272.

Patrizio, A. "Recursion Keeps Device Developers on the Edge." Recursion Software, Inc. Available at: http://www.recursionsw.com/About_Us/inc/SDTimes_Voyager.pdf.

"Data Acquisition and Control Programming Tools—Users Guide." Universal Library. Measurement Computing. Available at www.mccdaq.com.

Golatowski et al., "Service-Oriented Software Architecture for Sensor Networks," International Workshop on Mobile Computing, Jun. 1, 2003, pp. 1-8, Rostock, Germany.

Levis et al., "TinyOS: An Operating System for Sensor Networks," Ambient Intelligence, Jan. 1, 2005, pp. 115-148, Springer Berlin Heidelberg, Germany.

Marin et al., "Sensor Bean: A Component Platform for Sensor-Based Services," Proceedings for the 3rd International Workshop on Middleware for Pervasive and Ad-Hoc Computing, Nov. 28, 2005, pp. 1-8, vol. 115, Grenoble, France.

Morton et al., "An Approach to Develop Component-Based Control Software for Flexible Manufacturing Systems," Proceedings of the American Control Conference, pp. 4708-4713, May 8-10, 2002, IEEE, New York, NY.

* cited by examiner

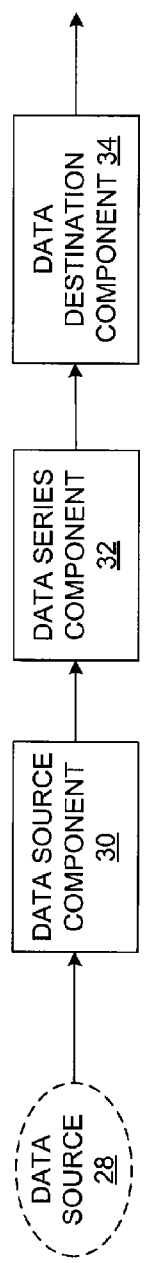
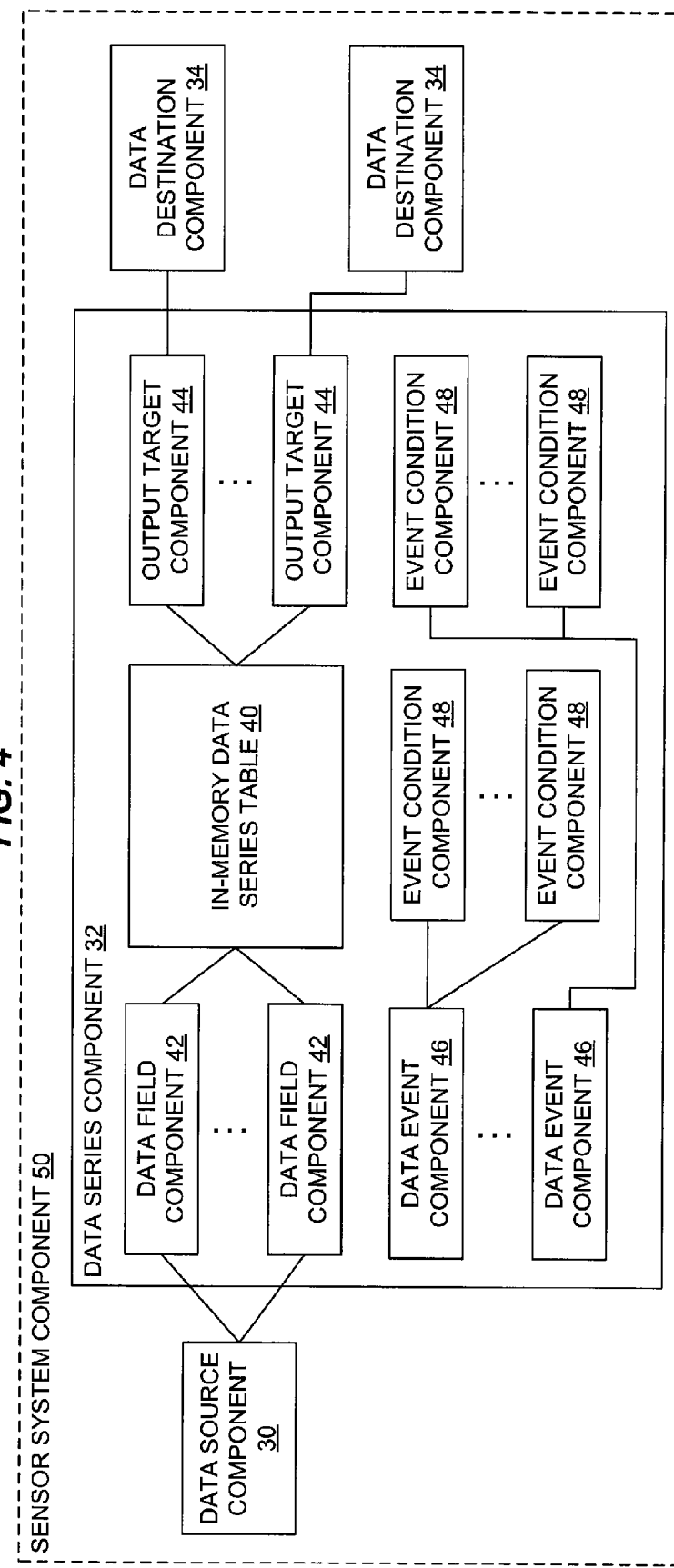
FIG. 4
FIG. 5

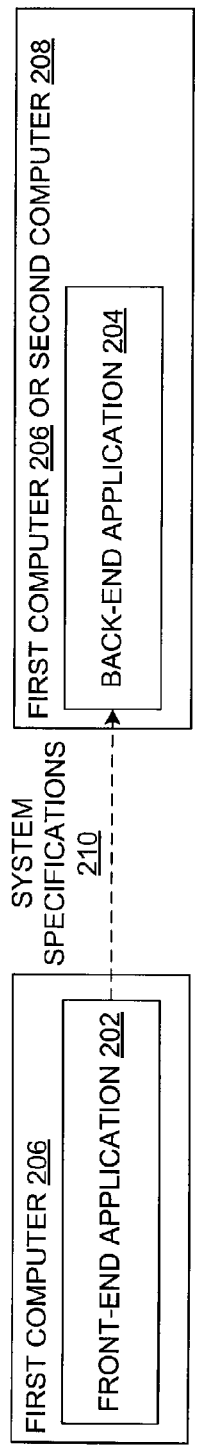
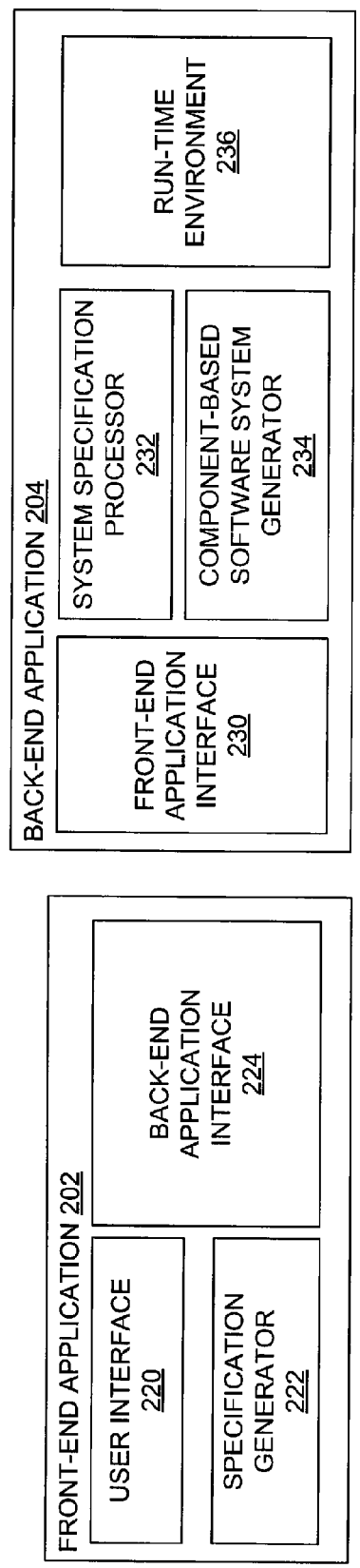
FIG. 13
FIG. 14
FIG. 15
FIG. 16

CONFIGURATION INTERFACE — 240

| SETUP | EXECUTABLES | SYSTEM SPECIFICATIONS | | | | BACK-END CONNECT/DISCONNECT |
|---|---|---|---|---|---|---|
| Internal ID | Process Name | Command Parameters | Run Status | StartUp Type | ShutDown Type | Description |
| 0 | Process X | | Stopped ▶ | Manual ▶ | Automatic ▶ | 🗎 |
| 1 | Process Y | | Automatic ▶ | Automatic ▶ | Manual ▶ | 🗎 |
| 2 | Process Z | | Started ▶ | Manual ▶ | Automatic ▶ | 🗎 |

[ DELETE SELECTED EXECUTABLES ]

☑ Override ShutDown Type (Stop All On Program Termination)

TRANSFER APPLICATIONS
DIRECTORY:
[ C:\... ]
○ DIRECTORY BROWSE        [ BROWSE ]
○ .zip FILE BROWSE        [ TRANSFER ]

FIG. 18

METHOD AND SYSTEM FOR RAPIDLY DEVELOPING AND DEPLOYING SENSOR-ENABLED SOFTWARE APPLICATIONS

RELATED APPLICATIONS

This application claims priority under 35 U.S.C. §120 as a continuation-in-part of the United States patent application filed on 14 Feb. 2007, entitled "METHOD AND SYSTEM FOR RAPIDLY DEVELOPING SENSOR-ENABLED SOFTWARE APPLICATIONS," and assigned application Ser. No. 11/674,893, the disclosure of which is expressly incorporated herein by reference and which itself claims priority under 35 U.S.C. §120 as a continuation-in-part of the United States patent application filed on 29 Jun. 2006, entitled "RECONFIGURABLE, HIERARCHICAL COMPONENT-BASED ARCHITECTURE & FRAMEWORK AND METHODS FOR RAPIDLY DEVELOPING SENSOR DEVICE-ENABLING SOFTWARE APPLICATIONS," and assigned application Ser. No. 11/478,085, the disclosure of which also is expressly incorporated herein by reference.

BACKGROUND

1. Field of the Invention

The present invention generally relates to software development systems and methods, and particularly relates to a method and system for rapidly developing and deploying sensor-enabled software applications.

2. Background

IDEs (integrated development environments), such as the VISUAL STUDIO development environment offered by MICROSOFT, greatly facilitate the development of complex software applications. However, whether or not an IDE is used, developing sensor-enabled software applications represents a significant programming challenge.

For example, a given software application may be required to collect and process sensor data from a variety of local and/or remote sensors. Generally, at least for each type of sensor involved, and for each type of connection (local or remote, file or database, etc.), the programmer must add dedicated program code. Further, given the possible interrelationships represented by the data being collected from different types of sensors and/or from sensors in different locations, and given the often asynchronous nature of sensor data events, coordinating the collection, processing and interlinking of such data is challenging to say the least.

SUMMARY

While the range of features and operations of sensor-enabled software applications varies as widely as the range of sensor types and desired functionality, most or all such applications commonly share the requirements of obtaining, processing and storing sensor data. In many instances, even these basic requirements require significant programmer effort, given the often asynchronous nature of sensor-based data acquisition, the wide range of data types involved, and the potentially complex data and processing flows involved. To that end, a component-based software toolset and corresponding method enable rapid development of sensor-enabled software applications based on defining and providing a set of sensor-related software components that operate as simple building blocks which are layered or hierarchically linked together to form complex and robust sensor-enabled software applications.

For example, in one or more embodiments, a component-based software toolset for rapidly developing sensor-enabled software applications includes a number of building block components, i.e., it includes a number of class definitions enabling a programmer to instantiate the building block components as needed or desired within the sensor-enabled software application being developed. Thus, in one more embodiments, the toolset comprises software component class definitions for a plurality of sensor-related software components, including data source components, data destination components, data series components, and data field components.

Correspondingly, this disclosure describes and claims a system for deploying component-based software systems for the implementation of desired sensor data process flows. The system makes use of the above-described toolset, or variations thereof. In one or more embodiments, the system comprises a front-end application operative to generate system specifications from user input, each system specification defining a desired component-based software system of one or more sensor components and their corresponding configurations in accordance with sensor component class definitions (e.g., the toolset) for a predefined set of sensor components tailored for building desired sensor data process flows. The system further includes a back-end application operative to store the sensor component class definitions for use in instantiating sensor components as needed, receive system specifications, and dynamically build and run the corresponding desired component-based software systems within a run-time environment provided by the back-end application.

Those skilled in the art will appreciate that the front-end and back-end applications may comprise separate applications configured for installation at the same computer or at different computers. In such embodiments, the front-end application allows users to define system specifications to be built and run by the back-end application. That is, each component-based software system comprises one or more sensor components selected from the predefined set of sensor components and configured by a user as needed to implement all or part of a desired sensor data process flow. With this framework, the user defines desired component-based software systems using the front-end application, and the back-end application dynamically builds and runs them, such that a target computer hosting the back-end application performs the desired sensor data processing.

With the above framework in mind, a programmer can build sophisticated sensor data acquisition and processing flows, simply by adding, inter-linking, and configuring a few simple components as building blocks. Further, the system described herein for deploying component-based software systems allows a user to "build" templates, e.g., system specifications, for desired component-based software systems in a front-end application, in accordance with the software components defined in the toolset, and then transfer those templates to a back-end application for dynamic instantiation and running. While not limited to installation on separate computers, the front- and back-end applications advantageously allow the user to generate system specifications at one location, and then distribute or transfer those specifications to any number of computers, which may be geographically dispersed, network-accessible computers intended for desired sensor data processing.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram illustrating a basic complement of sensor components provided by one or more embodiments of the toolset.

FIG. 5 is a block diagram illustrating one embodiment of the data series component illustrated in FIG. 4.

FIG. 13 is a block diagram of one embodiment of a system for deploying component-based software systems for the implementation of desired sensor data process flows.

FIG. 14 is a block diagram illustrating one embodiment of a system specification, and associated functional processing for building a desired component-based software system from the system specification.

FIG. 15 is a block diagram of one embodiment of a front-end application for generating system specifications for desired component-based software systems, such as may be functionally embodied as computer software stored in computer readable media.

FIG. 16 is a block diagram of one embodiment of a back-end application for generating system specifications for building and running desired component-based software systems based on receiving and processing corresponding system specifications, wherein the back-end application may be functionally embodied as computer software stored in computer readable media.

FIG. 18 is a diagram of a graphical user interface screen in one embodiment of the front-end application, wherein screen elements and controls enable selecting/configuring executable files for transfer to a back-end application for management thereby.

DETAILED DESCRIPTION

Figure 1:
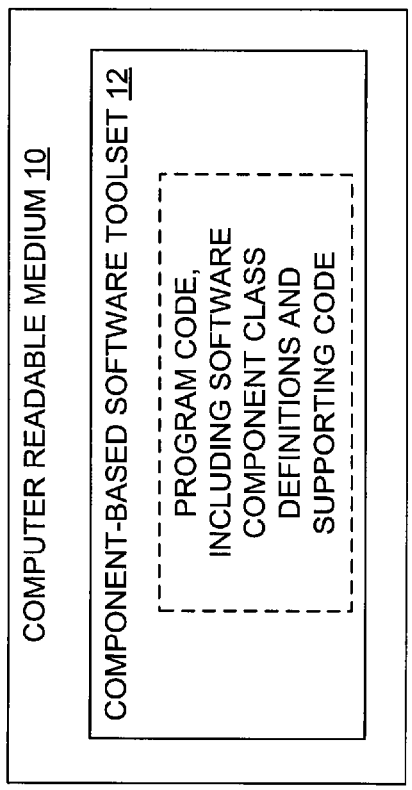
FIG. 1 is a block diagram of a computer-readable medium, such as system memory, disk, non-volatile storage, etc., storing one embodiment of a component-based software toolset for rapidly developing sensor-enabled software applications as taught herein.

FIG. 1 illustrates a computer-readable medium 10 storing one embodiment of a component-based software toolset 12 that includes program code supporting the rapid development of sensor-enabled software applications. The program code comprising the toolset 12 includes, in one or more embodiments, component class definitions and supporting code, that allow the programmer to rapidly add sensor-related data acquisition, processing, storage, and transfer functionality to a software application. However, although this disclosure refers to "sensor data" in many instances, and in its appended claims, those skilled in the art should appreciate that the term "sensor data" as used herein does not necessarily connote data obtained from a physical sensor. The apparatus and methods herein provide advantageous collection and processing functions for data from any source, such as computer or network log files, simulation and other computer processing results, etc.

Figure 2:
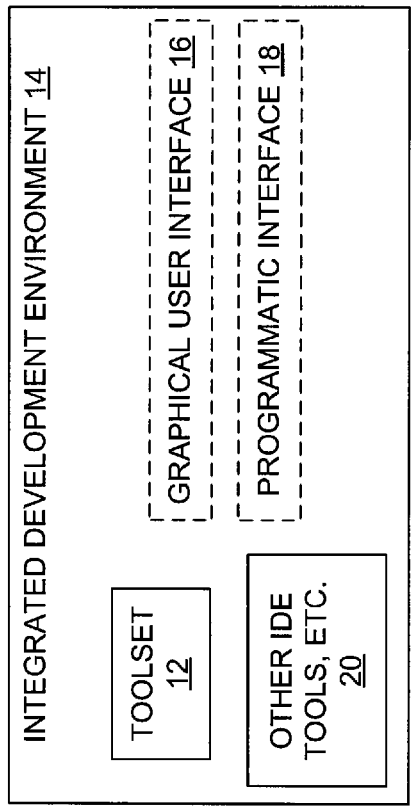
FIG. 2 is a block diagram illustrating an embodiment of the toolset of FIG. 1 implemented as an add-in for an IDE.

With the above broad applicability in mind, FIG. 2 illustrates that, in at least one embodiment, the toolset 12 is configured as an add-in to an IDE (Integrated Development Environment) 14, which includes a GUI (graphical user interface) 16 for drag-and-drop application development, a programmatic interface 18 for command-line/text-editor based programs, and other IDE tools and supporting software 20. In at least one such embodiment, the IDE 14 comprises MICROSOFT VISUAL STUDIO and the toolset 12 comprises an add-in toolset for VISUAL STUDIO. In this, and in other IDE embodiments, the toolset 12 provides graphical representations of its defined sensor-related components, such that the programmer can instantiate those components as needed via drag-and-drop programming. Further, the toolset 12 supports programmatic instantiation of its components and, for at least some of those components, supports programmatic control, such as manual data reads, event triggers, etc., as will be explained later herein.

Figure 3:
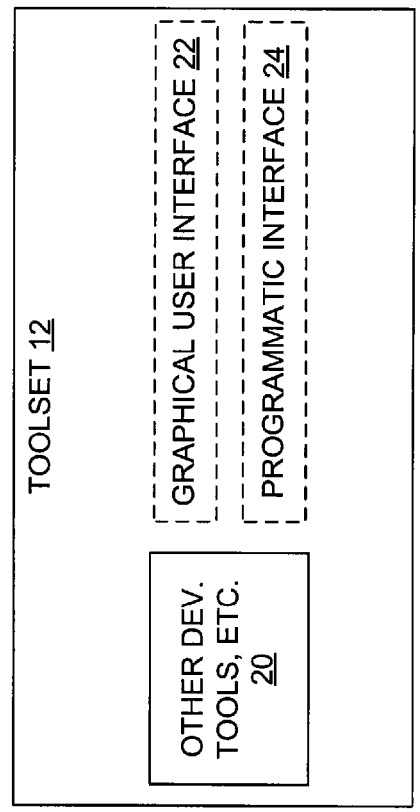
FIG. 3 is a block diagram illustrating an embodiment of the toolset of FIG. 1 implemented as a standalone software development application.

Of course, those skilled in the art will appreciate that the toolset 12 broadly comprises a set of sensor-related components that allow programmers to build sophisticated sensor-enabled software applications by adding predefined sensor-related components and interlinking those components to define potentially complex sensor data processing flows. As such, the toolset 12 may be configured as an add-in for IDEs other than VISUAL STUDIO, and different versions of the toolset 12 may be produced for different IDEs. Further, as illustrated in FIG. 3, the toolset 12 may comprise a standalone software application—although it still may link with other installed applications, such as language compilers, etc.—and may therefore include program code providing its own graphical and programmatic interfaces 22 and 24, respectively, and may provide a host of additional supporting development tools and functions 20.

FIG. 4 illustrates a basic building block approach, wherein the toolset 12 at least includes class definitions and supporting program code for instantiating data source components 30, data series components 32, and data destination components 34. With that, the illustration logically depicts a data source 28 which provides sensor data that is of interest. The data source 28 may logically represent, by way of non-limiting example, a data file holding sensor data, a database holding sensor data, a network socket connection providing sensor data, etc.

To obtain sensor data from the data source 28, the programmer instantiates a data source component 30, which is linkable to a specified source of sensor data and operative to obtain incoming sensor data from the specified source. That is, the data source component 30 allows the programmer to specify the particular data source (or sources for some types of data source components 30) from which to acquire sensor data, and further provides one or more software methods or functions for reading or receiving sensor data from the specified data source. Thus, generally speaking, the programmer adds a data source component 30 for each source of sensor data of interest, and each data source component 30 acts as an input conduit for sensor data from the linked source. Note, too, that one or more embodiments of the data source component 30 can obtain data from more than one source. That is, a given data component 30 can be reconfigured on the fly to bring in data from more than one source, or, in at least some embodiments, it can operate with changeable identifiers or commands that bring in data from different sources.

To collect incoming sensor data from the illustrated data source component 30, the programmer instantiates a data series component 32. The data series component 32 is linkable to a specified data source component 30 and is operative to generate an in-memory data series table (not shown in FIG. 4) and to automatically collect incoming sensor data from the linked data source component 30 in its data series table. As such, the programmer adds as many data series components 32 as desired for collecting the incoming sensor data from a given data source component 30. Further, the programmer links each data series component 32 to a desired number of data destination components 34 (one is illustrated), such that each data series component 32 automatically provides new table data from its data series table to each linked data destination component.

Thus, in the context of FIG. 4, the data source component 30 obtains sensor data from the data source 28, and thus acts as a source of incoming sensor data. In turn, the data series component 32 links to the data source 30 and automatically collects that incoming sensor data into its data series table. Further in turn, newly populated table data may be passed by the data series component 32 to the linked data destination component 34, which may be of a type that writes data to files, to a database, or that sends the table data over a network socket connection.

Notable details to be more fully explored later herein are that one or more embodiments of the data series component 32 can be configured to catch, filter, or otherwise process the incoming sensor data, to conditionally evaluate the incoming sensor data and/or the processed data, and to raise one or more programmer-specified events based on the conditional evaluation. However, it should be understood that even in their most simple embodiments, the data source component 30, data series component 32, and data destination component 34 together define a configurable sensor data processing flow that allows the software application being developed to obtain sensor data from a given data source 28, and automatically collects that sensor data into system memory, optionally qualifies and/or processes it, and then passes it along to a desired destination, subject to that qualification and processing. All of this can be done without any, or with very little manual programming, using point-and-click programming techniques.

Those skilled in the art may have recognized that the above example alluded to the potential sophistication of the data series component 32. FIG. 5 illustrates one embodiment of the data series component 32 in more detail, as defined by the associated class definitions provided in one or more embodiments of the toolset 12. The illustrated data series component 32 generates an in-memory data series table 40, and includes one or more data field components 42, each one defining a corresponding data field—i.e., column—in the data series table 40. The data series component 32 optionally further includes output target components 44, data event components 46, and event condition components 48. (Note that in the illustrated hierarchy the data field components 42 are children of the data series component 32, as are the data event components 46 and the output target components 44, while the event condition components 48 are children of respective ones of the data event components 46. Those skilled in the art will recognize the illustrated hierarchy as logically advantageous but non-limiting.)

As explained before, each data field component 42 is operative to define a data field in the data series table 40 of the (parent) data series component 32 by controlling which portion of incoming sensor data is stored in a corresponding column of the data series table 40 and by controlling the data type used for storing that portion of the incoming sensor data in the corresponding column. The data field component 42 includes methods enabling the programmer to specify these properties. That is, data field component 42 is defined to include one or more software methods or functions operative to receive programmer input identifying the portion of incoming sensor data to store in the corresponding column and indicating the desired data type to be used for storing that portion of the incoming sensor data.

In more detail, each data field component 42 allows the programmer to specify which portion of the incoming sensor data should be stored in the data series table field defined by that data field component 42. Also, where that portion of data is itself "composite" in some sense, the data field component 42 further allows the programmer to specify the elements or components of that composite data that is specifically of interest. For example, assume that a given data field component 42 is configured to take a byte array from the incoming sensor data. In that case, the data field component 42 allows the programmer to identify the one, several, or a range of array elements within that byte array that are of particular interest, such that only those specified elements are captured. Aiding this functionality, the data field component 42 may be defined such that an instantiated data field component 42 is operative to display data element selection options that are tailored for the particular data type that the programmer has selected for that data field component (e.g., offset and mask values for string, array, binary, packet).

In at least some embodiments, the class definitions for the data field component 42 also include one or more software methods or functions operative to perform on-the-fly data conversion as needed, such that the indicated portion of the incoming sensor data that is to be stored in the corresponding column of the corresponding data series table 40 is automatically converted to the desired data type. This dynamic data conversion may be quite sophisticated, and enables the conversion of disparate data types (e.g., float values to time/date stamps).

In the broader context, each data field component 42 is configurable by virtue of various options relating to the type of input data, the portions of elements of input data that are of interest for the data field defined by the given data field component 42, and the data type of the defined data field (which may be quite different than the data type of the incoming data portion that is of interest). In at least one embodiment of the toolset 12, the options presented for configuring a data field component 42 change as configuration decisions are made, i.e., the range of options presented narrows as higher-level options are successively set, meaning that the options presented at any given time are only those remaining options that are relevant or sensible. (Indeed, in one or more embodiments of the toolset 12, some or all of the component definitions include software methods or functions whereby the option/property settings of an instantiated component presented to the programmer are dynamically narrowed or tailored to display only those items appropriate for the current configuration state of the component.)

As an example, the field relationships that can be configured for a given data field component 42 are configurable via a number of options, but subsets of those options make sense for one type of input data but not others. Thus, in one embodiment of the toolset 12, the options presented to the programmer for a given data field component dynamically change as a function of the type of data source component 30 that is linked to the parent data series component 32.

As one example, for a command component type as the input source, the options for specifying the input data items of interest are the parameters associated with the command function or the return value(s) associated with the command function. As another example, if the parent data series component 32 links to another data series component 32 as its source of data, the options for setting the data field definitions indicate the data fields defined in the data series table 40 of the source data series component 32 (or can be related to an eXtensible Markup Language (XML) version of the data fields in the source data series component 32).

Further, regardless of what provides input data to a given data series component 32, the toolset 12 includes program code enabling data field components 42 to be used for defining "custom" data fields. In at least one such embodiment, the class definitions allow an instantiated data field component 42 to be used for defining a "custom" data field in the data series table 40 of its parent data series component 32. In this sense, the term "custom" denotes data not mapped directly from the incoming sensor data, although the custom value may be derived from that data.

For example, assuming that a given data series component 32 includes two data field components 42 that have been configured to define first and second integer data fields in the data series table 40 of their parent data series component 32. With that, the programmer could add a third data field component 42, and configure it to generate a custom data field value by adding the first two data field values. As such, each time a new row in the data series table is populated with new values for the first and second integer data fields, their sum would be stored in the custom data field of that row.

More generally, in at least one embodiment, the toolset 12 allows the programmer to define custom values by combining the incoming data for two or more defined data fields to obtain a custom field, or to otherwise mathematically or logically process all or part of the incoming data to derive a custom value. In other instances, custom values may comprise current time/date stamps, row count values, etc. In short, the custom value generation capability of the data field components 42 allows custom data values to be stored whenever a new row in the data series table 40 is populated with incoming sensor data.

Thus, the data field components 42 added to a given data series component 32 define the "schema" of the data series table 40 in that given data series component 32. That is, each added data field component 42 defines a corresponding column in the data series table 40, controls which data is stored in that column, and controls the type of data held in that column, performing data conversion if the incoming data for that column is of a different type.

While the data field components 42 control data inputs to the data series table 40, the output target components 44 control, or at least direct, data output from the data series table 40. More particularly, one or more embodiments of the toolset 12 include class definitions allowing the programmer to instantiate output target components 44 as desired, within the parent data series component 32. Each output target component 44 links the data series table 40 of the parent data series component 32 to a specified data destination component 34. More generally, each output target component 44 is operative to link the data series table 40 of its parent data series component 32 to a data destination component 34, such that the parent data series component 32 automatically passes data from its data series table 40 to any data destination component 34 linked to it by a given output target component 44. In at least some embodiments, each output target component 44 provides a Boolean "enable" flag that can be set and cleared programmatically, enabling run-time enabling and disabling of the output link between a given data series component 32 and targeted data destination component 34.

Notably, in one or more embodiments of the toolset 12, data series components 32 can be configured by the programmer to set the size (number of rows) of the data series table 40, and to control how data overflow conditions are handled. For example, as the data series component 32 automatically populates new rows in its data series table 40 in response to newly incoming sensor data, it will generally reach the maximum row count. At this point, in accordance with programmer-specified preferences, newly incoming sensor data will be ignored, i.e., not written to the table, or newly incoming sensor data will be added to the table according to a specified overwrite preference (e.g., oldest data overwritten first). As such, the data series table 40 can be frozen once its maximum size is reached, or it can be operated as, for example, a circular buffer.

In any case, even the above basic arrangement of components provides sophisticated, essentially automatic sensor data flow processing. To appreciate this point, assume that the data source component 30 obtains new incoming sensor data from the data source 28, e.g., new data comes in from a network connection. That sensor data automatically passes to the data series component 32. The data field components 42 break the incoming data down, or otherwise parse it, such that desired portions of the incoming data are mapped to the appropriate columns of the data series table 40 and, if necessary, perform automatic on-the-fly data type conversion, so that the data actually stored in the data series table 40 is of the desired data type. Thus, the data field components 42 collectively operate to automatically populate a new row in the data series table 40 with the mapped/converted data.

Then, as a function of a new row of data being populated in the data series table 40, each output target component 44 automatically passes the new row data out to the programmer-specified data destination component 34. The programmer can add as many output target components 44 as there are desired unique destinations for the table data, and this allows the table data of one data series component 32 to be mapped to multiple data destination components 34. As non-limiting examples, data destination components 34 can represent database writers, file writers, network socket connections, and other components within the toolset 12.

As a further point of flexibility, at least some embodiments of data series components 32 allow one data series 32 to be linked as the data source component 30 for another data series component 32. Such linking allows one data series component 32 to pass table data from its data series table 40 along to another data series component 32, which will store all or a portion of that table data according to its particular configuration.

Adding further to the sophistication of the data series component 32, one or more embodiments of the toolset 12 include class definitions allowing the programmer to instantiate data event components 46 for given data series components 32. In at least one such embodiment, data event components 46 are added as children of a data series component 32. Each data event component 46 is operative to conditionally trigger a desired action responsive to incoming sensor data for its parent data series component 32.

As simple, non-limiting examples, the programmer can configure one or more data event components 46 to filter or otherwise process incoming sensor data. For example, incoming sensor data can be blocked from the table unless it is at or above a defined threshold. As another example, incoming sensor data can be filtered, or otherwise adjusted as it is incoming, to the parent data series component 32. The action(s) taken by data event components 46 is conditional, based on an evaluation of the incoming data. To support conditional evaluation, the toolset 12 includes class definitions and supporting methods/functions allowing the programmer to instantiate event condition components 48 for each data event component 46. Each event condition component 48 is operative to define a condition to be tested or otherwise evaluated as the basis for conditionally triggering the desired action of the parent data event component 46. That is, an event condition component 48 is operative to receive one or more user-defined conditions used by the linked data event component 46. With this logical framework, data event components 46 are configured such that multiple event condition components 48 are addable to a given data event component 46, wherein each data event component 46 includes software methods or functions providing logical AND-ing and OR-ing associations between multiple event conditions.

In more detail, the specific operation and conditional triggering of a given data event component 46 is defined by the programmer based on configuring the event condition component(s) 48 added as children of the given event condition component 46. With this arrangement, each data event component 46 may be understood as comprising one or more conditional expressions (event conditions), wherein each conditional expression is defined by a child event condition component 48.

In at least one embodiment, an event condition component 48 operates with two expression values: (1) the incoming sensor data value of interest for a given data field component 42; and (2) a user-defined value, which may be entered by the programmer, another data field value within the same series, whether newly incoming or previously stored in the data series table 40 of the parent data series component 32, as selected by the programmer. Thus, as a non-limiting example, the programmer can define a conditional expression that may be defined using the sub-data intended for a given data field in a given data series table 40 and a past value of that same data field, to allow filtering of that data. Note that conditional evaluation is performed after any of the dynamic data type conversion operations carried out by any of the involved data field components 42 is completed, so that compatible or like data types are involved in the comparison(s).

Regardless, the two expression values are linked by an operation (e.g. greater than, equal to, less than, contains, etc.), which is specified by the programmer. With the expression values thus identified, and the conditional relationship between the two values defined, a given data event component 46 conditionally triggers responsive to incoming sensor data as a function of whether its defined condition(s) is satisfied. Where multiple conditions—i.e., multiple event condition components 48—are defined for a given data event component 46, the programmer can specify whether the data event component 46 should trigger as a function of OR-ing or AND-ing those multiple conditions.

As those skilled in the art will appreciate, the conditional logic afforded by the above structure enables the programmer to define very sophisticated data collection and filtering functions, provide alarm-based functions, etc. For example, a given data series component 32 can be made to ignore newly incoming sensor data unless one or more values (as segregated by the field component mappings) exceed a given threshold. By ignoring the data, the field components 42 do not write data into the data series table 40, and the output target components 44 do not pass data along to the specified data destination components 34. Thus, data not of interest can be blocked from propagating into the processing flow. The data event components 46 also have, in at least some embodiments, programming hooks allowing the programmer to conditionally trigger the execution of custom code, and essentially any number of conditional actions may be taken.

To appreciate such functionality in operation, immediately before a row of data values are inserted into the data series table 40 by the field components 42, the data series component 32, or other program code within the toolset 12, checks to see if there are any data event components 46. If so, every event condition (conditional expression) defined for each event component 46 is evaluated. If the event conditions for a given one of the data event components 46 are satisfied (e.g., "true"), then the conditional action defined by that data event component 46 is performed. Otherwise, the conditional action is not performed.

Conditional event triggering, sub-data selection (and automatic conversion), data destination targeting, and other functions afforded by data series components 32 make them a useful building block for programmers developing sensor-enabled software applications. However, the encapsulation and hierarchies illustrated in FIG. 5 for the data series component 32 are extended in one or more embodiments of the toolset 12, such that the toolset 12 offers programmers a fully hierarchical set of building blocks. While various embodiments of the toolset 12 adopt varying hierarchical arrangements of component building blocks, FIG. 6 illustrates the arrangement adopted in one embodiment of the toolset 12.

According to the illustrated embodiment, the toolset 12 includes a sensor system component 50, which is operative to contain, among other items, a related collection of data source, data series, and data field components. That is, the programmer can instantiate a data sensor system component 50, and then instantiate within it the desired number of child data source components 30, data series components 32, and data destination components 34. As such, and as its name implies, the sensor system component 50 effectively provides programmers with the ability to create a complete sensor data processing sub-system within their software applications simply by instantiating (via drag-and-drop or program code) a sensor system component 50 and populating it with the desired configuration of child components.

Figure 6:
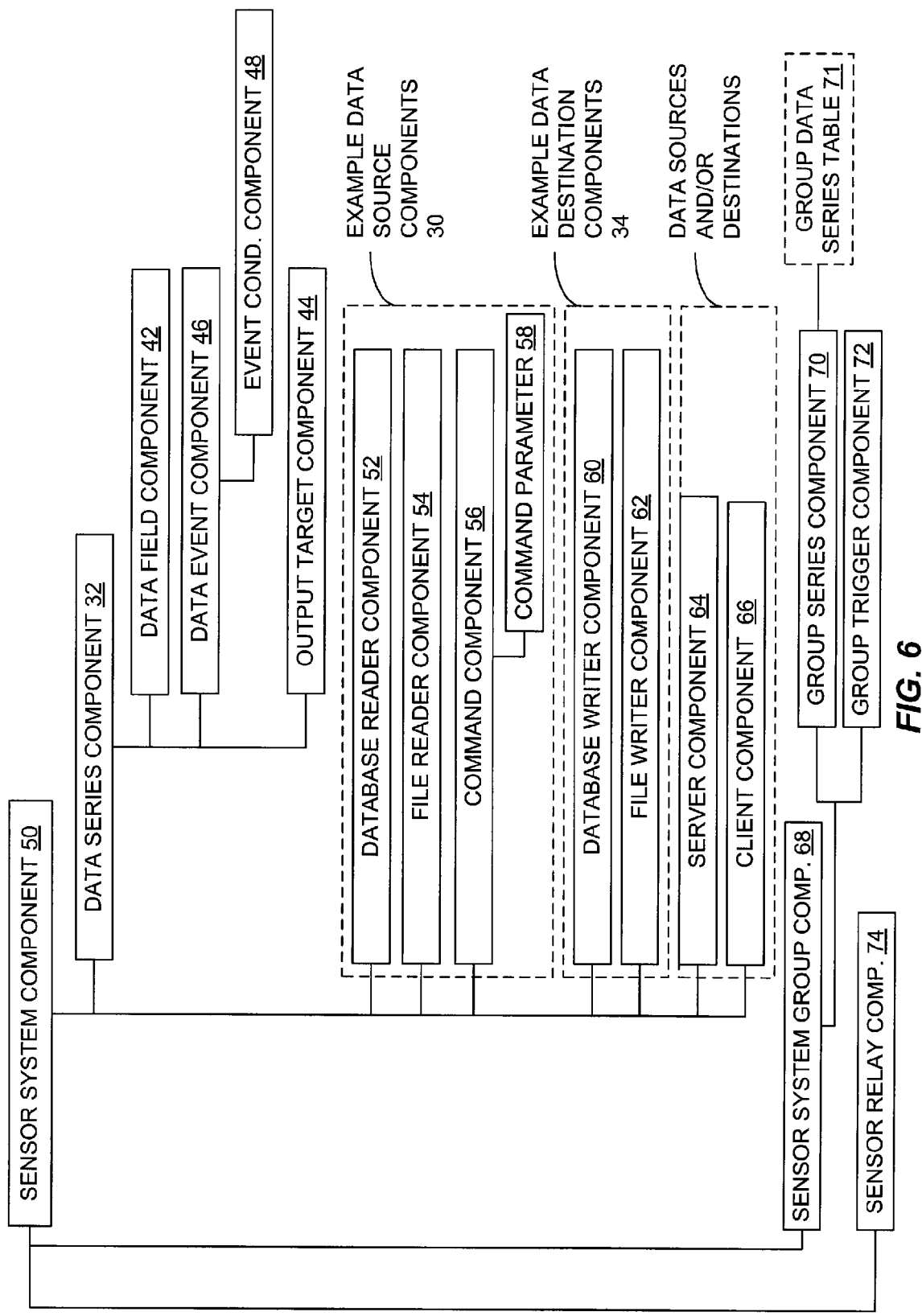
FIG. 6 is a block diagram illustrating one embodiment of the sensor system component defined by one or more embodiments of the toolset.

FIG. 6 also is notable in that it illustrates specific example species of data source components 30 and data destination components 34. More particularly, FIG. 6 illustrates that the heretofore generically described data source components 30 may comprise any one or more of a database reader component 52, a file reader component 54, and a command component 56 (with any number of its related child command parameter components 58). Thus, sources of sensor data include, but are not limited to, data files (such as may be created by data loggers), databases (such as may be created or maintained by data acquisition software), and "command" data sources (which generally represent third-party functions in the form of APIs (application programming interfaces) or unmanaged DLLs (dynamic link libraries). The program code comprising the toolset 12 thus allows the programmer to instantiate the type or types of data source components 30 needed for the software application being developed.

For example, the program code defining the data source component class includes program code defining a file reader component class enabling the programmer to instantiate file reader components 54 as needed, each one operative to obtain sensor data from a user-specified data file. More particularly, the file reader component 54 with its included properties and methods reads data from a specified file, and provides an indication that new data is available.

In that manner, any data series component 32 that is linked to the file reader component 54 recognizes that the file reader component 54 has read new data from its target file, and automatically pulls that new data in from the file reader component 54. To facilitate automatic population of new file data into the data series table 40 of a linked data series component 32, the data series component 32 allows the programmer to specify "file reader" as the input type and to specify the file reader name or identifier, to link the specifically desired file reader component 54 with the data series table 40 of the data series component 32. Note that multiple file reader components 54 may be instantiated within any given sensor system component 50, and any data series component 32 within the same sensor system component 50 can specify any file reader component 54 within the same sensor system component 50 as its input.

Once a file reader component 54 is instantiated and a given data series component 32 is linked to it, file data is read from the target file using read methods provided by the file reader component 54. These read methods provide numerous options that enable the programmer to specifically define what part(s) of the file need to be read. When linked to a given data series component 32, every time a row of data is read from the target file, that data is automatically populated in the corresponding data series table 40, subject of course to the field definitions imposed on that table, and subject to any conditional events defined for that table.

As non-limiting examples, file reader components 54 include software methods or functions enabling them to read, among other formats, XML, Comma-separated values (CSV), Binary, Excel, and Text files. In the case of XML files, the file reader component 54 allows the programmer to specify a node depth, indicating the node depth of the data. Finally, file reader components 54 also include file close methods that allow their target files to be released for other use. As such, file reader components 54 allow the software application to automatically read sensor data from a local or network-available data file, and push that data into the data processing flow(s) defined by the selected arrangement of sensor components as provided by the toolset 12.

Similar data retrieval functionality is provided for databases via the database reader component class definitions, which allow the programmer to instantiate database reader components 52 as needed, each operative to obtain sensor data from a user-specified database. Thus, database reader component 52 instantiated within a parent sensor system component 50 serves as the data source component 30 for any one or more of the data series components 32 that reside within that parent sensor system component 50.

The programmer uses each database reader component 52 to read data from a database table and then automatically insert that data into a corresponding data series table 40. To accomplish this, the database reader component 52 includes software methods and properties that enable it to read data from a target database, and indicate the availability of that new data, such that any link data series component 32 automatically populates a new row in its included data series table 40 with that new data, subject, of course, to the field definitions imposed on that table and on any event conditions associated with that table.

The class definitions for the database reader components 52 include methods and properties that allow the programmer to set input type and name values, that link a given database reader 52 to the desired target database. More particularly, the programmer can specify the type of database, connection string, connection type, provider driver, location of the database server, database name, database table name, and authentication credentials, as well as a query statement. Non-limiting examples of supported database types include SQLServer (where SQL denotes Structured Query Language), Access, MySQL, and Oracle. Connection strings and provider drivers for SQLServer, Access, MySQL, and Oracle databases are automatically generated and provided. In cases of a database outside of the aforementioned database types, the connection strings and provider driver may be linked in for compatibility with closed, proprietary databases.

In any case, once a database reader component 52 is instantiated and configured by the programmer, it acts as a source for sensor data for any data series component that is linked to it. As with the file reader components 54, any number of data series components 32 within the same parent sensor system component 50 can be linked to the same database reader component 52.

Still further data retrieval options are available to the programmer via use of command components 56. That is, the program code defining the data source component class includes, in one or more embodiments of the toolset 12, program code defining a command component class. These class definitions enable the programmer to instantiate command components 56, each operative to wrap a user-specified API (e.g., a WINDOWS API) or unmanaged DLL, such that the user-specified API or unmanaged DLL operates as a source of sensor data within the parent sensor system component 50. Effectively, command components 56 allow the programmer to integrate third-party program code meant for specific types of sensors or other data sources. Non-limiting examples include third party cameras, frame grabbers, data acquisition devices, etc.

In operation, the programmer instantiates a command component 56 and one or more child command parameter components 58 for each API/DLL function to be "wrapped" within the sensor system component 50. A single command component 56 represents one function that needs to be wrapped (from the API or unmanaged DLL). The command component 56 can have a return value, just like a function. The various parameters/arguments associated with the third party function being wrapped must be defined by using command parameter components 58. In general, a command component 56 is created for every function to be wrapped and, for each such command component 56, a command parameter component 58 is instantiated for each parameter or argument needed for the wrapped function. Callbacks can also be implemented dynamically in order to interact with the third party function. Advanced data types, such as structures, classes, etc., can also be passed in as command parameters, or received as return arguments.

As with the database and file reader components 52 and 54, a given command component 56 can operate as a data source component 30 for any number of data series components 32 within the same sensor system component 50. With that arrangement, data reads (or the equivalent acquisition function) can be exercised for the API/DLL function wrapped by a given command component 56, and the command component 56 indicates the availability of the new data, such that any linked data series components 32 automatically populate a new row in their respective data series tables 40, subject to field definitions and event conditions.

One advantageous use of command components 56 is the marshaling of sensor data from unmanaged to managed code. That is, the command components 56 enable the programmer to use dedicated WINDOWS API and unmanaged DLL functions, such as driver software for special types of sensors, in a managed code environment, such as the .NET environment of MICROSOFT VISUAL STUDIO.

Also, note that command components 56 can be controls, as well. For example, one command component 56 can read a motion detector via the DLL function it wraps. Assuming that a return value of that function indicates motion, another command component 56 can be used to call a function that unlocks perimeter doors, sounds alarms, etc.

Further, while the command components 56 provide an advantageous mechanism for obtaining data via WINDOWs API and unmanaged DLL functions, data of interest also may be generated via managed code DLLs of other functions operating within a given software application incorporating one or more of the toolset's components. Data from such sources and others can be input to a given data series component 32 using an "add values" method or function provided in the toolset 12. (In at least one embodiment, the class definition for data series components 32 includes an add values method.)

The add values method can be called programmatically at run-time, for example, and it provides for the direct input of specified data into the data series table 40 of the data series component 32 for which the method is invoked. (The data input by the add values method is processed via the data field components 42 and any data event components 46, like other data incoming to a data series component 32.)

As one example of the add values method use, assume that the desired source of input data for a given data series component 32 is the serial port of a PC (not shown). Serial port data values may be available via functions that do not require wrapping via command components 56. As such, those functions may be called to obtain serial port data and that obtained data may be pushed into a given data series component 32 using the add values method of that given data series component 32.

Of course, the toolset 12 also offers a number of advantageous data output mechanisms as well, which include a number of destination components that serve as targets for output data and, in one or more embodiments, software methods or functions for outputting table data from the data series table 40 of a given data series component 32. For example, at least one embodiment of the toolset 12 includes program code defining a "memory stream" method or function that, on invocation, outputs one or more rows of table data from a data series table of an instantiated data series component 32 as stream data. The ability to stream out a full row of table data in a single stream is advantageous for certain types of data, such as large byte arrays, etc. In at least one such embodiment, the data series component class definition(s) include a memory stream method that can be invoked for any given data series component 32 of interest.

As for defined data destination components, in one or more embodiments, the program code comprising the toolset 12 includes class definitions allowing the programmer to instantiate several different types of data destination components 34. Non-limiting examples of data destination component types include database writer components 60 and file writer components 62.

Each database writer component 60 instantiated within a parent sensor system component 50 allows the exportation of table data from the data series tables 40 of the data series components 32 that are linked to that database writer component 60 through output target components 44. (Note that in an alternate embodiment, output target components 44 are not used, and data destination components 34 include software methods or functions allowing them to be linked to respective data series components 32.)

To facilitate the logging of table data from the linked data series components 32, each database writer component 60 allows the programmer to define the source of the data to be logged, the output parameters, the connection management details, and the database type. An appropriately configured database writer component 60 thus is operative to log data in real-time for a specified data series component 32. Notably, the database writer component 60 automatically creates (if the database table doesn't exist) and inserts data into the database table whenever a row of data gets added to the related data series table 40, assuming that the database writer component 60 is enabled. Moreover, the database connections are automatically opened and closed, and the connection strings and drivers needed to connect to the various database formats are automatically provided depending on the connection type and database type specified. Additional information, such as the username, password, database name, table name, and file path, can be specified within the constructs provided by the database writer component 60.

Similarly, file writer components 62 enable the programmer to output table data from a linked data series component 32, for example, to a target file specified by the programmer. That is, each file writer component 62 instantiated by the programmer enables the exportation of table data to any one or more common data file formats. Each file writer component 62 thus allows the programmer to specify the source of the data to be logged, the output parameters to be used, and the file type involved. With that information, the file writer component 62 automatically creates (if the file doesn't exist) and inserts table data into the data file whenever new table data is added to the data series table 40 of a linked data series component 32.

While the above examples of data source component types and data destination component types provide convenient mechanisms for bringing sensor data into a sensor system component 50, and outputting structured data (table data) from that sensor system component 50, FIG. 6 further illustrates two component types capable of serving as inputs and outputs, namely server components 64 and client components 66.

Broadly stated, one or more embodiments of the toolset 12 include class definitions enabling the programmer to instantiate server components 64 and client components 66, as needed. Each server component 64 and client component 66 is operative to obtain sensor data from user-specified network socket connections, or to send table data from a linked data series table 40 through a user-specified network socket connection. Moreover, each such component supports Transport Control Protocol/Internet Protocol (TCP/IP) and User Datagram protocol (UDP) communications, for both IPv4 and IPv6. (As will be described later, this capability allows protocol conversion from IPv4 to IPv6 (or vice versa) merely by linking together an appropriately configured client-server component pair.)

In more detail, each server component 64 can send data to and/or receive data from a plurality of specified network addresses, and each server component 64 can be linked to any number of client components 66. (In contrast, each client component 66 either sends data to or receives data from one network address or linked server component 64 at a time. In more detail, each server component can simultaneously maintain multiple network connections, where the client maintains only one network connection at a time. However, because the network connections can be re-specified for servers and clients on the fly, a given client component can connect one-at-a-time to any number of network addresses.) These one-to-many and many-to-one mappings between server components 64 and client components 66 enable complex interlinking between component building blocks, and provide for very sophisticated sensor data processing flows.

For example, a given data series component 32 in a parent sensor system component 50 may be linked to a server component 64 within the same sensor system component 50 (using an output target component 44). Thus, with respect to that given data series component 32, the linked server component 64 operates as a data destination component 34, and automatically receives structured data (table data) as new rows are populated in the data series table 40 of that given data series component 32. In turn, the sensor system component 64 can "broadcast" that table data to any number of specified network addresses and/or to any number of linked client components 66, which may be configured as data source components 30 for other data series components 32 in the same sensor system component 50.

Thus a server component 64 can send and receive from any number of network addresses and linked client components 66—it can be configured to do one or both for any given network address or linked client component 66. On the other hand, each client component 66 links to one network address or server component 64 at a time, and either sends or receives data from that one address or server component 64. Consistent with this interlinking framework, a server component 64 can link to any number of data series component 32 as a data source for those data series component 32. Similarly, any number of data series components 32 can target a given server component 64 as a data destination.

In more detail, each instantiated server component 64 allows the programmer to specify the IP addresses of interest, and corresponding details for security mask, port, protocol (UDP or TCP), IP version (v4 or v6), and packet size. Files, messages, byte arrays, and data series table rows can be sent using server components 64 (and client components 66). Security protection can be specified by an IP security mask property of the sever component 64.

Each server component 64, with its included properties and methods, defines how to output data via TCP or UCP (IPv4 or IPv6) and/or how to receive data via TCP or UDP (IPv4 or IPv6). Among other things, by using server components 64 in conjunction with client components 66, data can be transmitted via TCP or UDP (IPv4 or IPv6) in real-time over Local Area Networks (LANs) and Wide Area Networks (WANs).

The client components 64 offer like functionality, in terms of network connectivity. One significant difference, as mentioned above, however, is that individual client components 64 either send data to or receive data from one connection, e.g., one server component 64, whereas each server component 66 can send data to, and receive data from (or bi-directionally do both) for any number of network connections. Indeed, a server component 64 can be configured such that some of its network connections are inputs, some are outputs, and some are bidirectional. In this manner, table data incoming to a given sensor component 64 can be broadcast to any number of connections.

Helpfully, at least one embodiment of the server and client components 64 and 66 includes software methods allowing each instantiated server component 64 and client component 66 to append a programmer-specified (custom) header to outgoing data. This allows, for example, a given server or client component 64 or 66 to "stamp" the data it is sending, to mark its origin, its state of processing, etc.

In more detail, one or more embodiments of the data series components 32 allow the programmer to set options for header operations. For example, assuming that the input type property of a given data series component 32 has been set to "server" or "client," the configurable options for that data series component 32 will include one or more header options, such as "NONE" (meaning that no processing is performed on the header appended by a source server or client component 64 or 66 to the incoming sensor data), or "CONTAINS" (meaning that some action will or will not be taken depending on the contents of the appended header). One conditional action would be to ignore the incoming sensor data in dependence on the contents of the appended header. Note that this header processing functionality happens "before" the data fields processing performed by the data field components 42.

Turning from the example collection of components that are children of the sensor system component 50, FIG. 6 also illustrates two components included in one or more embodiments of the toolset 12 that are peers with the sensor system component 50, and that provide useful operations involving one or more sensor system components 50. Namely, FIG. 6 illustrates a sensor system group component 68, with its child group data series component 70 and group trigger component 72, and further illustrates a sensor relay component 74.

Put simply, a sensor system group component 68 collects table data from the data series tables 40 in one or more data series components 32 that are of interest, and merges that data into an in-memory group data series table 71 that is generated by its child group data series component 70.

In other words, a sensor system group component 68 is much like a sensor system component 50, except that the inputs to sensor system group components 68 are selected data fields from the data series tables 40 of specified data series components 32 in one or more sensor system components 50. With that similarity, the group data series component 70 is the same or similar to the data series components 32 used in sensor system components 70. Thus, as with the data series components 32 and their respective data field components 42, the group data series component 70 uses data field components 42 to define the schema for collecting data into its group data series table 71.

In general terms, an instantiated sensor system group component 68 provides pick lists or other selection mechanisms for identifying the sensor system components 50 that are of interest for data merging. This selection convenience is further extended by providing selection mechanisms allowing the programmer to identify the data series components 32 within each such sensor system component 50, such that the data series tables 40 that are of interest to the programmer with regards to group data collection may be easily identified.

As will be explained, one or more embodiments of the toolset 12 allow the programmer to configure different types of sensor system group components 68. However, in general, toolset program code enables the instantiation of sensor system group components 68 that are each operative to generate a group data series table 71 in system memory, and to merge user-selected table data from the data series tables 40 of one or more data series components 32 into the group data series table 71.

In one type of sensor system group component 70, referred to as a "bulk-merge" type, the sensor system group component 70 can be commanded (e.g., programmatically commanded at run-time) to collect selected data fields from the same rows in the data series tables 40 in any number of data series components 32, whether the data series components 32 are in one or multiple sensor system components 50.

In more detail, a bulk type sensor system group component 68 allows the grouping of data fields from one or more data series tables 40 based upon primary key(s). With the invocation of a "bulk merge" method, the given sensor system group component 68 merges the contents taken from primary key data fields in the data series tables 40 within any number of specified data series components 32 into a new row in the group data series table 71 of that given sensor system group component 68. More particularly, the contents of primary key data fields in the current row of each specified data series table 40 are collected and populated in a new row of the group data series table 71 upon invocation of a bulk merge.

In support of the above bulk-merge functionality, the data field components 42 can include a primary key property or value enabling the data field component 42 to be designated as a primary key for the data series table of its associated data series component 32. With that designation, the corresponding data field (column) in the data series table 40 of the parent data series component 32 will be identified as a primary key data field.

In another type of sensor system group component 70, data merging is triggered according to triggering conditions defined by the group triggering component 72, which is instantiated as the child of a parent sensor system group component 68. Complementing this arrangement, the class definitions further enable the programmer to instantiate sensor group trigger components 72, each operative to link to a user-specified sensor system group component 68 (e.g., in a parent-child relationship) and to receive user input identifying one or more event conditions to be used as triggers for obtaining the user-selected table data and merging it into the group data series table of the linked sensor system group component 68.

Thus, for a simple group type of sensor system group component 68, the programmer adds group trigger components 72 as desired, to define the event conditions that will trigger the collection of group data from the data series tables 40 of the specified data series components 32. As with a data event component 46, the programmer adds a group trigger component 72 for each event to be defined, and then adds event condition components 48 as children of each group trigger component 72 to define the conditional evaluation test for determining whether the group event will be triggered.

An instantiated sensor system group component 68 can be set to one type or the other via configuration options presented to the programmer. In either case, data automatically is collected into the group data series table 71 when an event-based group trigger instructs the group data series component 70 to add the current values of all the linked data fields of the specified data series tables 40, or when a "bulk merge" method supported by the sensor system group component 68 is invoked, e.g., called in software.

Turning to sensor relay components 74, each instantiated sensor relay component 74 is operative to link a first data series component 32 in one sensor system component 50 to a second data series component 32 in the same or another sensor system component 50, such that the first data series component 32 operates as a data source for the second data series component 32. In other words, each sensor relay component defines a link that allows a data series component 32 residing within one sensor system component to relay table data to another data series component 32 residing in a different sensor system component 50. With a relay link in place, the second data series component 32 automatically receives a new row of table data anytime the first data series component 32 populates a new row of its data series table 40.

By using sensor relay components 74, table data can be passed between different sensor system components 50 using only one server component 64 or client component 66. To understand the advantage of linking data series components 32 in the above manner, as opposed to, for example, linking two client components 66 in the same sensor system component 50 to the same server component 64, one should appreciate that each such client connection uses a connection port. In instances where it is desirable to minimize the number of open connection ports, such as when going through secure network firewalls, strategic use of sensor relay components 74 can minimize the number of open ports needed.

For example, assume that it is desired to send table data out from multiple data series tables 40 through one network connection. To accomplish this, the programmer can use sensor relay components 74 to pass table data from one or more data series components 32 into another data series component 32 (in or across sensor system components 50), such that that other data series component 32 effectively collects the data from the other relay-linked data series components 32. In turn, table data from that data series component 32 can be output to one client component 64.

Figure 7:
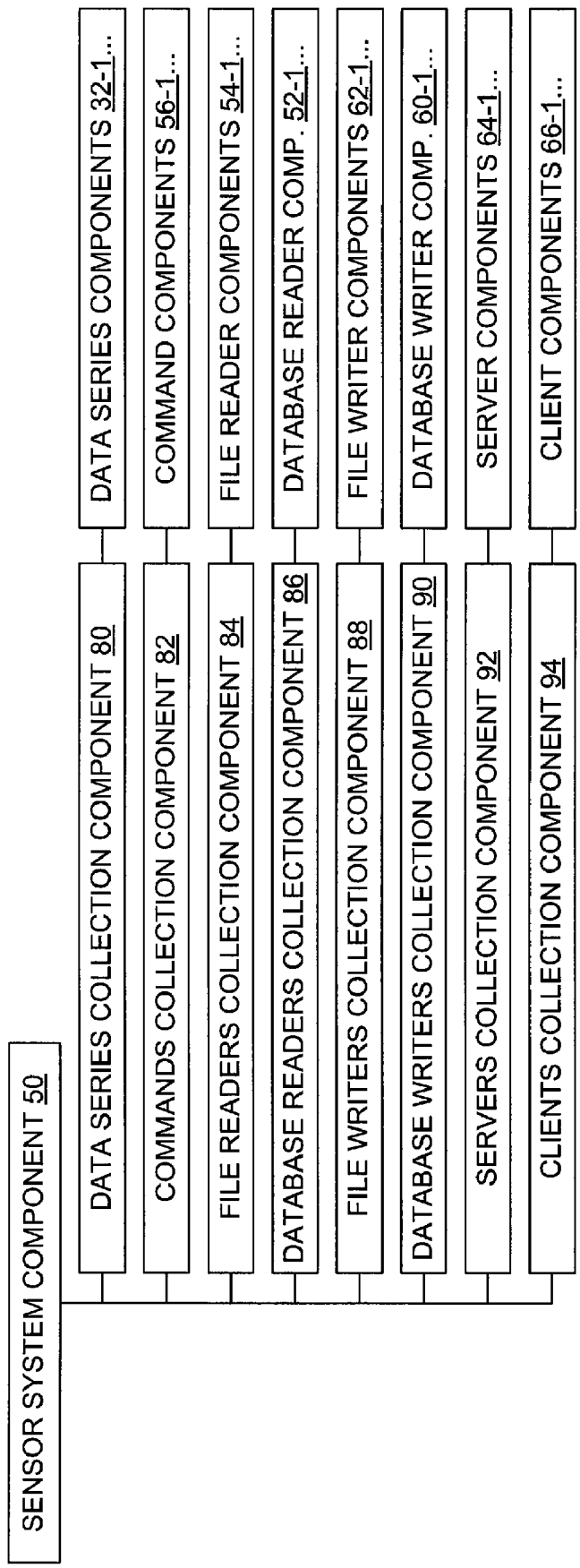
FIG. 7 is a block diagram of the object model used for one embodiment of the sensor system component included in the toolset.

FIG. 7 provides further details for the object model organization of the sensor system component 50, as embodied in one or more embodiments of the toolset 12. Here, the class definitions included in the toolset 12 include a number of "collections" components, that serve as convenient collection devices for adding the desired number of a given type of component to a given sensor system component 50.

For example, FIG. 7 illustrates a data series collection component 80 as a child of a parent sensor system component 50. The data series collection component 80 is addable to the parent sensor system component 50 and is operative to allow the programmer to add individual data series components 32 (e.g., 32-1 . . . ) as desired to the parent sensor system component 50, wherein each data series component 32 is linkable by the programmer to one data source component 30 within the parent sensor system component 50 and is operative to collect sensor data from the linked data source component 30 into its in-memory data series table 40.

Further, while not illustrated, the toolset 12 may provide a data fields collection component addable to a parent data series component 32 and operative to allow the programmer to add individual data field components 42 as desired to the parent series component 32, each said data field component 42 operative to define a data field in the data series table 40 of the parent data series component 32.

The figure further illustrates several examples of a data sources collection component, which is addable to the parent sensor system component 50 and is operative to allow the programmer to add individual data source components 30 as desired to the parent sensor system component 50, each said data source component 30 acting as a source of sensor data.

Here the data sources collection component is not generically represented, but rather is represented by specific examples of data sources collection components.

For example, one sees that a data sources collection component may comprise a commands collection component 82 that is addable to the parent sensor system component 50 and is operative to allow the programmer to add command components 56 (e.g., 56-1 . . . ) as desired to the parent sensor system component 50, each said command component 56 operative to wrap a WINDOWS API function or an unmanaged DLL as a data source component 30 within the parent sensor system component 50, such that the WINDOWS API function or unmanaged DLL acts as a source of sensor data within the parent sensor system component 50.

As another example, one sees that the data sources collection component may comprise a file readers collection component 84. This component is operative to allow the programmer to add file reader components 54 (e.g., 54-1 . . . ) as desired to the parent sensor system component 50, each file reader component 54 linkable to a target file by the programmer and operative to read data from the target file, such that the target file acts as a source of sensor data.

The data sources collection component additionally or alternatively may comprise a database readers collection component 86 operative to allow the programmer to add database reader components 52 (e.g., 52-1 . . . ) as desired to the parent sensor system component 50, each database reader component 52 linkable to a target database by the programmer and operative to read data from the target database, such that the target database acts as a source of sensor data.

Further, in at least one embodiment, the toolset 12 may be defined as a web services data source component that operates much like the command components 56. However, where command components 56 obtain data by wrapping API/DLL functions, the web services components obtain data via web applications.

Turning from data sources to data destinations, the sensor system component 50 may include a data destinations collection component addable to a parent sensor system component 50, which is operative to allow the programmer to add individual data destination components 34 as desired to the parent sensor system component 50, each said data destination component 34 linkable by the programmer to any number of data series components 32 within the parent sensor system component 50 and operative to receive the sensor data collected by the linked data series components 32.

As with the data sources collection component, FIG. 7 does not illustrate a generic data destinations collection component, but rather illustrates several specific examples, any or all of which may be included in the parent sensor system component 50. As a first example, the figure illustrates that the data destinations collection component may comprise a file writers collection component 88 operative to allow the programmer to add file writer components 62 (e.g., 62-1 . . . ) as desired to the parent sensor system component 50. Each file writer component 62 is linkable to a target file by the programmer and operative to write sensor data from any linked data series components 32 to the target file, such that the target file acts as a destination for sensor data collected by the linked data series components 32.

Additionally, or alternatively, the data destinations collection component may comprise a database writers collection component 90 operative to allow the programmer to add database writer components 60 (e.g., 60-1 . . . ) as desired to the parent sensor system component 50. Each database writer component 60 is linkable to a target database by the programmer and operative to write sensor data from any linked data series components 32 to the target database, such that the target database acts as a destination for sensor data collected by the linked data series components 32.

The figure further illustrates (as a data sources collection component and/or as a data destinations collection component) a servers collection component 92 that is addable to the parent sensor system component 50 and operative to allow the programmer to add server components 64 (e.g., 64-1 . . . ) as desired to the parent sensor system component 50. Each server component 64 is configurable by the programmer to operate as a data source component 30 and/or data destination component 34. That is, each server component 64 supports multiple simultaneous network connections and can send and/or receive data from any one or all of those connections.

The figure further illustrates (as a data sources and/or data destinations collection component) a clients collection component 94 that is addable to the parent sensor system component 50 and operative to allow the programmer to add client components 66 (e.g., 66-1 . . . ) as desired to the parent sensor system component 50. Each client component 66 is configurable by the programmer to operate as a data source component 30 receiving data from a specified network address or as a data destination component 34 sending data to a specified network address. Note that at least one embodiment of client components 66 allows a given client component 66 to be configured with multiple connection configurations, e.g., a list of network address, but only one such connection is active at a time. However, during run-time execution, the active address of a given client component 66 can be changed or updated to change what it is connected with.

Figure 8:
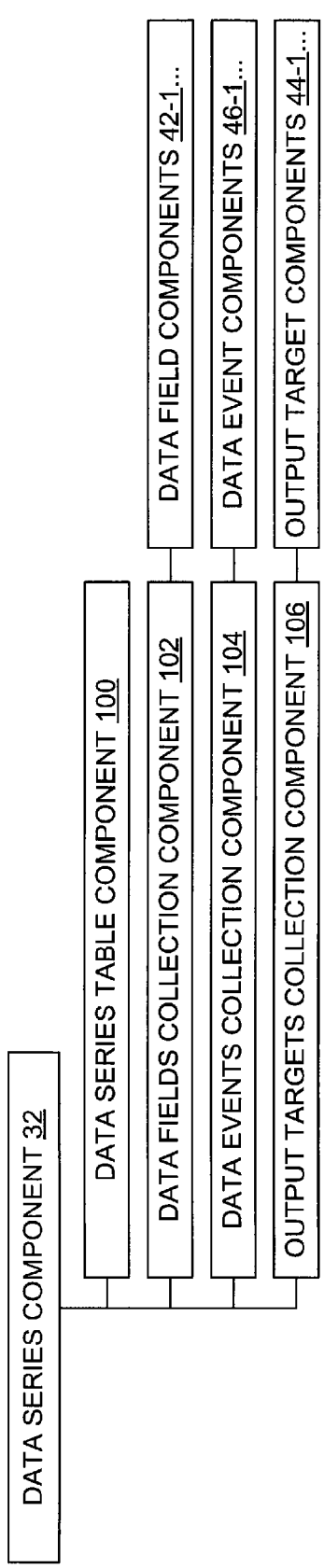
FIG. 8 is a block diagram of the object model used for one embodiment of the data series component included in the toolset.
Figure 9:
FIG. 9 is a block diagram of the object model used for one embodiment of the data event component included in the toolset.

Continuing with non-limiting examples of the object models adopted for the component building blocks of the toolset 12, FIGS. 8 and 9 illustrate object models for the data series component 32 and the data event component 46. With respect to FIG. 8, one sees an example, wherein the data series component 32 includes a data series table component 100, which offers methods and properties for building and accessing the data series table 40 generated by each instantiated data series component 32. The model further includes a data fields collection component 102, operative to allow the programmer to add as many data field components 42 (e.g., 42-1 . . . ) as desired for defining the schema to be used for structuring data stored in the data series table 40.

The model further includes a data events collection component 104, operative to allow the programmer to add data event components 46 (e.g., 46-1 . . . ) as desired, to a parent data series component 32. Likewise, the model further includes an output targets collection component 106, operative to allow the programmer to add output target components 44 (e.g., 44-1 . . . ) as desired, to a parent data series component 32.

Referring now to FIG. 9, one sees that in the illustrated object model an event conditions collection component 108 may be instantiated as a child of a parent data event component 46. The event conditions collection component 108 is operative to allow the programmer to add event condition components 48 (e.g., 48-1 . . . ) as desired, to a parent data event component 46.

Figure 10:
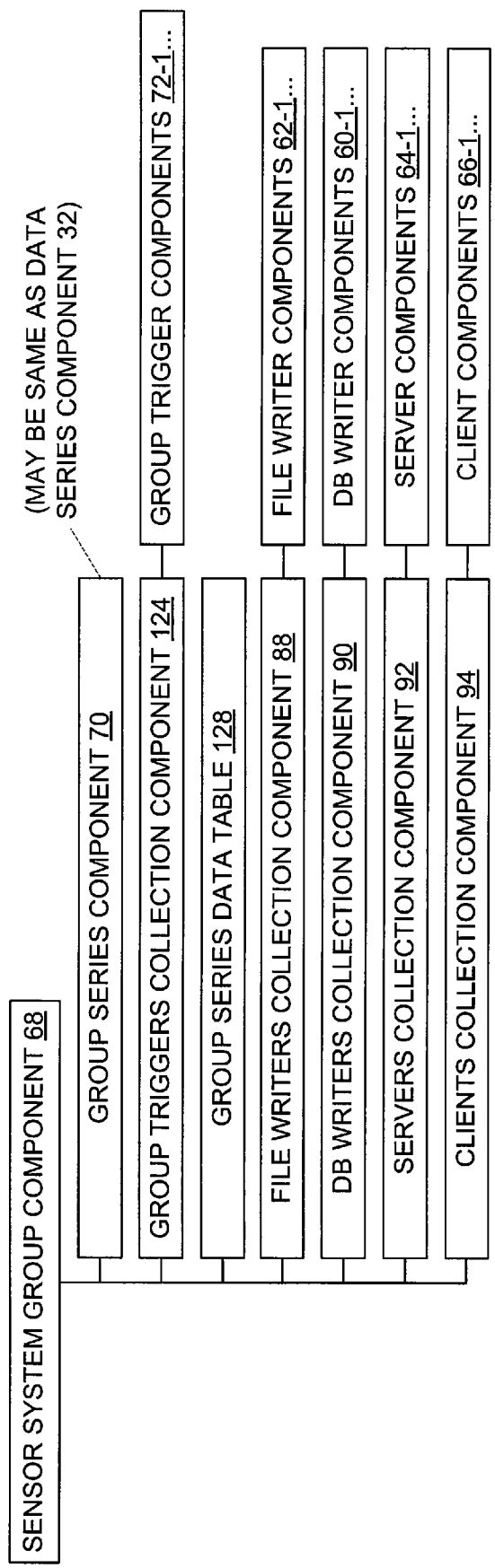
FIG. 10 is a block diagram of the object model used for one embodiment of the sensor system group component included in the toolset.

Continuing with object model examples, FIG. 10 illustrates an object model that may be used by the toolset 12 for the sensor system group component 68. In addition to the sensor system group components that have already been discussed, the object model illustrates a group triggers collection component 124, which is operative to allow the programmer to add group trigger components 72 (e.g., 72-1 . . . ) as desired to a parent sensor system group component 68.

The model further includes a group data series table component 128, which functions much like the data series table component 100 of the data series component 32—i.e., it provides for generation and manipulation of the group data series table generated by each instantiated sensor system group component 68.

Of course, other object models with other parent-child relationships may be used, in at least some instances, to effect the same or similar functionality in the toolset 12. Notably, for any given hierarchical component model, one or more embodiments of the toolset 12 include program code supporting component copying, which may be referred to as a "cloning" function that can be performed at design time, and can be invoked programmatically at run time. With component cloning, the toolset 12 generates a complete copy of a selected component (or of selected groups of components), wherein the copied components include all of the configured details (option settings, values, etc.) of the original component(s).

As a further convenience, at least one embodiment of the toolset 12 includes program code supporting component serialization and de-serialization. More particularly, the toolset 12 may include program code to serialize and de-serialize an instantiated component, and any components contained therein, to and from an XML file.

Figure 11:
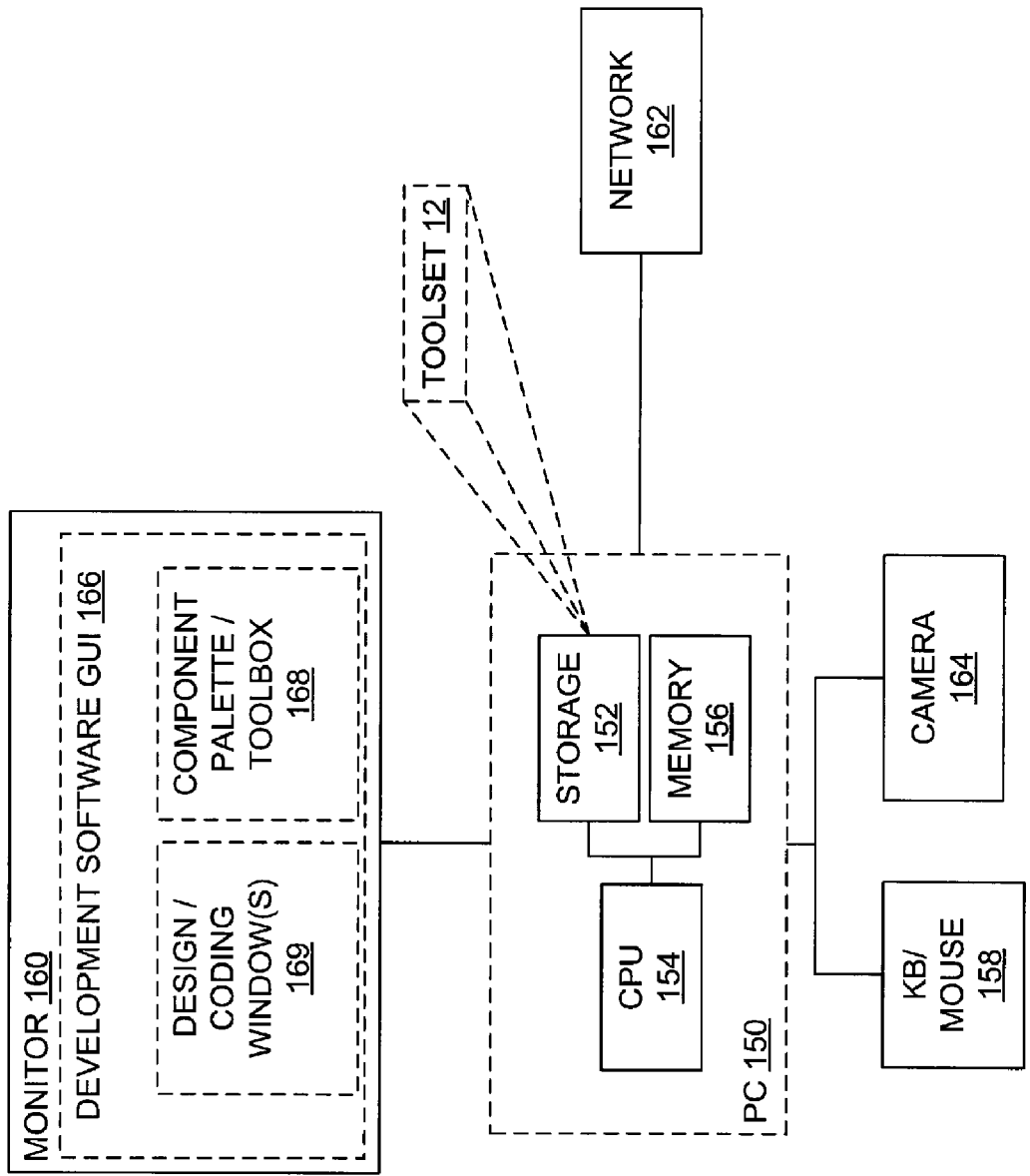
FIG. 11 is a block diagram of one embodiment of a development system and application hosting platform, which may be used with the toolset.

Turning from implementation details to a practical, although non-limiting, example of using the toolset 12, FIG. 11 depicts PC (personal computer) 150 that is configured for development of a sensor-enabled software application using an embodiment of the toolset 12, which may be held in installed form in a storage device 152 of the PC 150. The PC 150 further includes a CPU (central processing unit) 154, system or working memory 156 (e.g., DRAM), and is connected to keyboard and mouse peripherals 158 and a monitor 160. The PC 150 also may be connected to a network 162 and, of particular interest for this example, an external camera 164 (e.g., a USB-connected camera device, where USB denotes Universal Serial Bus).

As a non-limiting example of developing sensor-enabled software applications, the toolset 12 and/or supporting operating system and development software installed on the PC 150 provide a GUI 166, which provides one or more programming windows and provides access to the sensor component building blocks of the toolset 12. For example, the GUI 166 may display a component palette/toolbox 168, which provides for convenient selection and instantiation of the sensor components included in the toolset 12. The GUI 166 also may provide design and coding windows 169, which provide for graphically-based "forms" design and other drag-and-drop design operations, as well as code editing windows.

Figure 12:
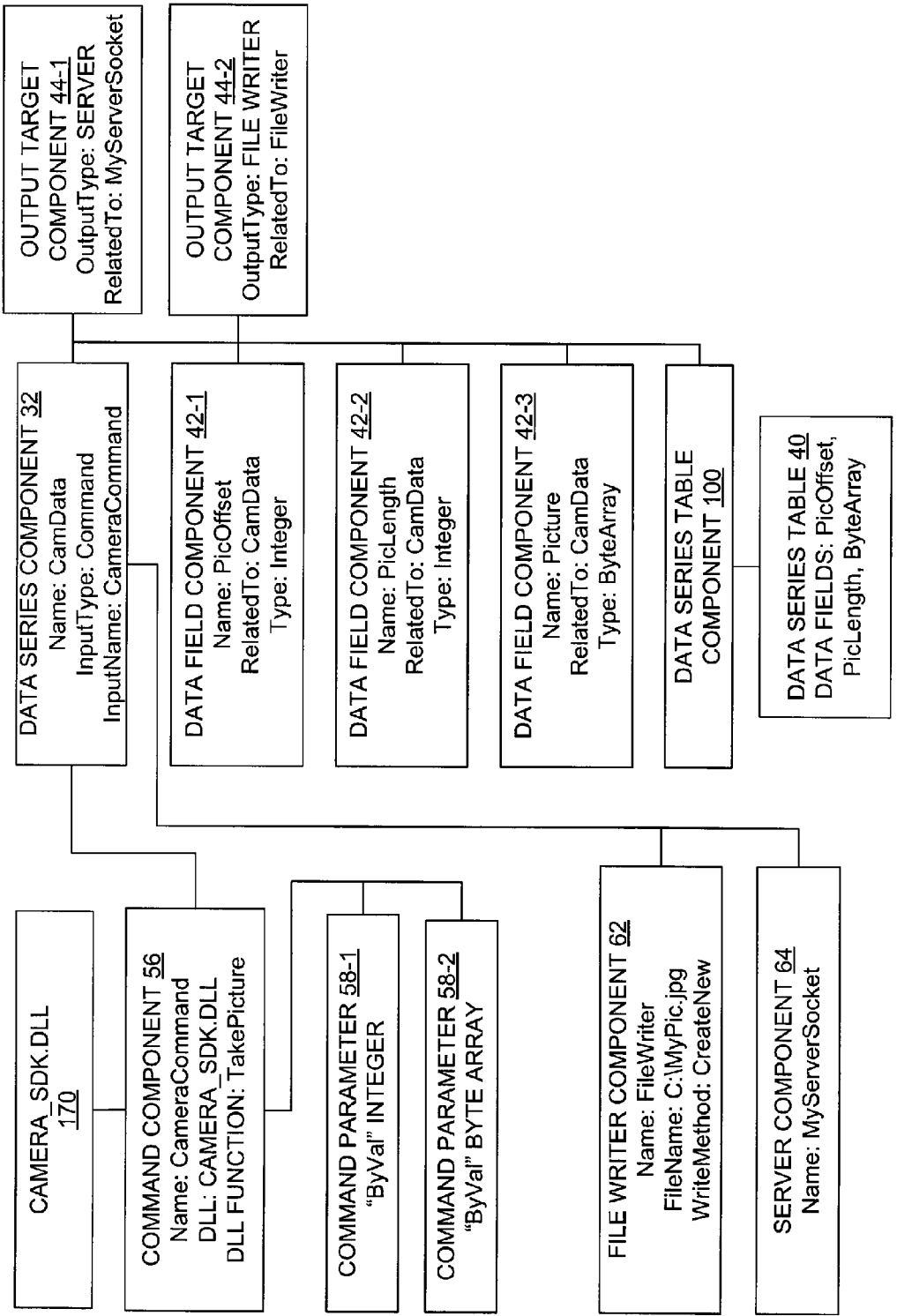
FIG. 12 is a block diagram of toolset components for an example sensor-enabled software application.

With the above development system, FIG. 12 provides one example use of the toolset 12, wherein selected sensor components within the toolset are used to obtain data as desired from the attached camera 164. First, one may assume that the camera manufacturer provides driver software for the camera and that such software is installed on the PC 150. In the diagram, the DLL "CAMERA_SDK.DLL" 170 represents the unmanaged DLL to be used for interfacing with the camera 164.

To wrap this unmanaged DLL—i.e., to use the unmanaged DLL within a managed code environment, such as the .NET framework of VISUAL STUDIO, the programmer instantiates a command component 56, sets it name to "CameraCommand" for example, and links it to a "take picture" function of the camera DLL (DLL=CAMERA_SDK.DLL, DLL FUNCTION=TakePicture). Because the TakePicture function to be exercised by the command component 56 returns two parameters (integer data and the picture itself as a ByteArray), the programmer instantiates two child command parameter components 58-1 and 58-2. The first command parameter component 58-1 is configured for integer data and the second command parameter component 58-2 is configured for ByteArray data.

The programmer then links an instantiated data series component 32 to the command component 56. That is, the programmer configures the data series component to link to the command component 56 as its data source component 30, such that the data series component receives camera data from the command component 56 as its incoming sensor data. Further, the programmer instantiates three data field components 42-1, 42-2, and 42-3, that control the collection of camera data in the data series table 40, while the data series table component 100 creates/manages the data series table 40 into which the camera data is stored, as structured by the field data components 42-1, 42-2, and 42-3.

Further, assuming that the programmer desires to output table data from the data series table 40 to a network connection and to a data file, the programmer instantiates two output target components 44-1 and 44-2, one linking the data series component 32 with a file writer component 62 ("FileWriter"), and the other linking the data series component 32 with a server component 64 ("MyServerSocket"). The server component 64 is configured with the appropriate network connection information (addresses), while the file writer component 62 is configured with the desired file name and desired method(s) of writing data to the file.

With the above configuration, the software application or system in which the toolset components are included can initiate a data read from the camera 164 by calling a read method provided by the command component 56. In response, the command component 56 calls the TakePicture function as defined by the CAMERA_SDK.DLL, and the command parameter components 58-1 and 58-2 allow the resulting camera data to be passed to the data series component 32.

The data series component 32 automatically adds a new data series (row) to its data series table 40 responsive to the newly incoming camera data, subject to the filtering/parsing and, optionally, data conversion operations, of the data field components 42-1, 42-2, and 42-3. Further, the newly added table data is passed along from the data series component 32 to the specified data destinations (file writer component 62 and server component 64), as linked to the data series component via the output target components 44-1 and 44-2. In turn, that data is written to the specified file by the file writer component 62 to the targeted data file, and is sent by the server component 64 to the targeted network addresses.

Those skilled in the art should appreciate that the above example represents the linking to an unmanaged DLL for camera control and data retrieval, the structuring and formatting of the resultant camera data in an automatically-updated, in-system memory table, and the automatic passing of data from that table to a data file and any number of network connections, all without requiring the programmer to write a single line of program code. In this instance, and in significantly more complicated scenarios, the toolset 12 thus represents a potentially enormous timesaver for programmers. Further, the toolset 12 enhances application robustness and simplicity by providing standard component building blocks that include components and properties enabling straightforward interlinking between components.

With the above and other examples in mind, and considering the toolset 12 in its various embodiments, those skilled in the art should keep in mind that, broadly, the toolset 12 provides an apparatus and method of facilitating the rapid development of sensor-enabled software applications. In at least one such embodiment, the toolset 12 supports a method of rapidly developing sensor-enabled software applications comprising providing software component class definitions for a plurality of sensor-related software components.

The class definitions include definitions for a data source component linkable to a specified source of sensor data and operative to obtain incoming sensor data from the specified source, such that a programmer adds a data source component for each source of sensor data of interest.

The class definitions further include a data series component linkable to a specified data source component and operative to generate an in-memory data series table and to automatically collect incoming sensor data from the linked data source component in its data series table, such that the programmer adds as many data series components as desired for collecting the incoming sensor data from a given data source component.

The class definitions further include a data field component operative to define a data field in the data series table of an associated data series component according to programmer-selected properties, and to thereby control automatic population of that data field by the associated data series component, such that, for each given data series component, the programmer adds as many data field components as there are desired data fields for the data series table of that given data series component.

The class definitions further include a data destination component linkable to one or more specified data series components and operative to receive table data from the data series tables of the linked data series components, such that the programmer adds as many data destination components as desired, and links each data destination component to as many data series components as desired.

Still further, the class definitions include a sensor system component operative as a container for related collection of data source, data destination, data series, and data field components, such that the programmer instantiates a sensor system component and adds data source, data destination, data series, and data field components as desired.

Still further, the class definitions include a sensor system group component linkable to a number of sensor system components and operative to generate an in-memory group data series table and merge specified table data from specified ones of the data series tables in the linked sensor system components into its group data series table.

Still further, the class definitions include a sensor relay component operative to link a first data series component contained within a first sensor system component to a second data series component contained within the same or a second sensor system component, such that the first data series component operates as a data source component for the second data series component.

Still further, the class definitions include a data event component that is operative to conditionally catch or filter incoming sensor data for an associated data series component according to one or more specified triggering conditions, such that, for a given data series component, the programmer adds as many data event components as there are desired conditional catching or filtering operations to be conditionally triggered for the incoming sensor data. Complementing that functionality, the class definitions further include an event condition component operative to define a programmer-specified triggering condition for an associated series data event, such that the programmer builds an associated set of triggering conditions for a given data event component by adding and configuring a corresponding number of event condition components.

Still further, the class definitions include server components and client components, wherein each server component is linkable by the programmer as a data destination component or as a data source component for one or more specified client components, and wherein each client component is linkable by the programmer as a data destination component or a data source component to a specified server component. According to these class definitions in one or more embodiments, the server and client components include, within each such definition, software methods or functions supporting TCP/IP or UDP based network communications, using either or both IPv4 and IPv6.

Further according to these definitions, the server component is linkable by the programmer to any number of specified network addresses, and is operative to act as a data source component or as a data destination component for individual ones of the specified network addresses. Similarly, according to these class definitions, the client component is linkable by the programmer to a specified network address, and is operative to act as a data source component or as a data destination component for the specified network address.

Still further, the class definitions include at least one of a file reader component operative to read sensor data from a specified data file, a database reader component operative to read sensor data from a specified database, a command component operative to wrap a specified WINDOWS API function or unmanaged DLL and obtain sensor data via the specified WINDOWS API or unmanaged DLL. Complementing these functions, the class definitions may further include a command parameter component operative to allow the programmer to specify function parameters or arguments for obtaining sensor data via the specified WINDOWS API or unmanaged DLL, i.e., by specifying a particular command component, such that the command parameter component passes the specified parameter to that command component for use with the API or DLL wrapped by that command component.

Still further, in one or more embodiments of the toolset 12, one or more of the toolset components (e.g., data series components 32, command components 56, etc.) include programmatic hooks, allowing programmatic extension of their behavior and/or modification of their behavior. For example, program code can, via one or more hooks, inspect or update property values and other configuration settings of a given component. One example would be the run-time modification of network address information for a server component or a client component 64 or 66. Another example would be the additional proprietary compression or encryption code, either to a data series component 32 or to a data destination component 34.

Also, as a general point, those skilled in the art should appreciate that the toolset 12 can be implemented as an add-in for an IDE, or implemented as a standalone development system. By way of non-limiting examples, the toolset 12 can be implemented as a standalone application for the WINDOWS, MAC OS X, LINUX, and UNIX operating systems (and variants thereof), and can be implemented as an IDE add-in for MICROSOFT VISUAL STUDIO, ECLIPSE (open source), NETBEANS (SUN MICROSYSTEMS), WEBSPHERE (IBM), and other IDEs.

Whether configured as an IDE add-in or as a development application in its own right, the toolset 12 offers a powerful set of sensor-related component class definitions allowing the programmer to instantiate the number and types of sensor-related components needed for a particular application, and to interlink and configure these components to define the desired sensor-data processing flows.

Moreover, as alluded to earlier in the context of FIG. 3, standalone software applications for implementing sensor data process flows may be based on an embodiment of the toolset 12. As used herein, a given sensor data processing flow comprises a desired set or sequence of processing operations for sensor data, such as acquiring, filtering, and storing/distributing. Sensor data process flows thus represent a desired set or collection of processing steps or actions to be taken with regard to particular sensor data, and generally relate to identified sources and/or destinations of sensor data.

In any case, FIG. 13 illustrates one embodiment of such standalone software, wherein a system 200 is configured for deploying component-based software systems for the implementation of desired sensor data process flows. (Note that one or more of the software components in the toolset 12 can be used to call functions, output control data, commands, etc. Thus, it should be understood that the component-based software systems can be used to interface with actuators, e.g., doorlocks, alarms, etc., in addition to or in alternative to their use in implementing desired sensor data processing.)

The illustrated system 200 comprises a front-end application 202 and a back-end application 204. While not considered part of the system 200, it should be noted that the front-end application 202 may be installed or otherwise embodied on a first computer 206 and the back-end application 204 may be installed or otherwise embodied on a second computer 208, which preferably is communicatively linked to the first computer 206 (such as through the Internet). Of course, in one or more embodiments of the system 200, the front-end application 202 and the back-end application 204 may be installed or embodied on the same computer and, indeed, they may comprise functional subparts of an integrated application.

Referring momentarily to FIG. 14, the front-end application 202 in one or more embodiments is operative to generate system specifications 210 from user input, and the back-end application 204 in one or more embodiments is operative to generate component-based software systems 212 based on processing the system specifications 210. In this sense, a given system specification 210 may be considered as a template for a desired collection of sensor components to be instantiated and configured by the back-end application 204. Thus, in the context of this disclosure, each system specification 210 defines a desired component-based software system 212 of one or more sensor components and their corresponding configurations in accordance with sensor component class definitions for a predefined set of sensor components that are tailored for building sensor data process flows. In at least one embodiment, the system specifications are generated in accordance with the sensor component class definitions contained in the toolset 12, and the corresponding component-based software systems 212 are generated by instantiating selected sensor components from the toolset 12.

Thus, a system specification 210 may be understood as a collection of information that identifies the particular types, numbers, and configurations of sensor components selected from the predefined set of sensor components in the toolset 12, that are to be instantiated in the corresponding component-based software system 212. In turn, each component-based software system 212 may be understood as comprising one or more sensor components instantiated from the toolset 12 and configured in accordance with information in the corresponding system specification 210. For example, a given component-based software system may comprise one or more sensor system components 50 configured to perform user-specified sensor data processing operations.

Continuing with the system description, the back-end application 204 is operative in one or more embodiments to store the sensor component class definitions for use in instantiating sensor components as needed. The back-end application 204 is further operative to receive system specifications 210, and dynamically build and run the corresponding desired component-based software systems 212 within a run-time environment provided by the back-end application 204.

Thus, in one or more embodiments the back-end application 204 includes or accesses the software class definitions comprising the toolset 12. With access to these class definitions, the back-end application 204 can instantiate the particular sensor components to be included in a given component-based software system 212, as identified by the system specification 210 corresponding to that given component-based software system 212.

In any case, as noted above, the front-end and back-end applications 202 and 204 may comprise an integrated application, or may comprise separate but complementary applications. In either embodiment, the front-end and back-end applications 202 and 204 can be installed on the same computer, and on different computers.

For example, at least the front-end application 202 may be installed on the first computer 206 and at least the back-end application 204 may be installed on the second computer 208, which may be remote from the first computer 206 but preferably is communicatively linked to it (such as through the Internet). In this context, a user of the first computer 206 can define desired component-based software systems 210 based on inputting the information needed to generate the corresponding system specifications 210, and can then transfer those system specifications 210 to the second computer 208, where the back-end application 204 dynamically builds and runs the desired component-based software systems 212.

More particularly, in one or more embodiments, the user of the first computer 206 can cause the back-end application 204 executing at the second computer 208 to build new component-based software systems 212 on the fly and/or to modify existing component-based software systems 212 on the fly, based on transferring new and/or modified system specifications 210 to the second computer. More generally, the front-end application 202 is operative to communicate with the back-end application 204 for transfer of system specifications 210 from the first computer 206 to the second computer 208, such that a user of the first computer 206 defines the system specifications 210 for the desired component-based software systems 212 and transfers them to the second computer 208, whereupon the back-end application 204 dynamically builds and runs the desired component-based software systems at the second computer 208.

As non-limiting advantageous operation, particularly in the context of transferring system specifications 210, the front-end application 202 is operative in one or more embodiments to package the system specifications 210 generated from the user input, and to transfer the packaged system specifications to the back-end application 204. In such embodiments, the back-end application 204 is configured to un-package each packaged system specification received from the front-end application, and to build and run the corresponding desired component-based software systems 212 from the un-packaged system specifications.

As a non-limiting example, the front-end application in one or more embodiments is operative to package system specifications 210 by serializing them into extensible Markup Language (XML) files. In such embodiments, the back-end application 204 is operative to un-package packaged system specifications by parsing metadata and corresponding data from the XML files.

Further, the back-end application 204 in one or more embodiments is operative to transfer system specifications 210 to other (like) back-end applications 204, which may be running at different but communicatively linked computers, such that one back-end application 204 executing on one computer can share systems specifications 210 with another back-end application 204 executing on another computer. In such embodiments, the back-end applications 204 may be configured to package system specifications 210 for transfer.

As a point of further flexibility and user convenience, in at least one embodiment of the system 200, the front-end application 202 is operative to store system specifications 210 for recall, inspection, and modification by a user. Complementing this capability, the back-end application 204 is operative to dynamically update an existing component-based software system 212 running within its run-time environment responsive to receiving a modified system specification 210 for the existing component-based software system 212.

In the same or other embodiments of the system 200, the front-end application 202 is operative to define functional associations between sensor components in a desired component-based software system 212 and external executable programs callable within the run-time environment of the back-end application 204, and is operative to identify any such functionally associated external executable programs to the back-end application 204.

This functionality allows, for example, the back-end application 204 to start and stop, or otherwise manage one or more executable programs within its run-time environment, such that those executable programs can be used as needed or desired in the sensor data processing being carried out by the component-based software systems running within the run-time environment of the back-end application 204. Thus, at least one embodiment of the back-end application 204 is operative to initiate or call the functionally associated external executable programs as identified by the front-end application 202, such that one or more external executable programs can be executed to support operation of the component-based software systems 212 running within the run-time environment of the back-end application 204.

As a non-limiting example, one or more embodiments of the front-end application 202 include a remote configuration interface accessible to a user via a computer network having a connection with a host computer running the back-end application 204. That is, the front-end application 202 may comprise a web browser application and/or a transferable applet (e.g., a JAVA applet), such that a user having remote access to a computer system running the front-end application can define system specifications as needed or desired. Alternatively, in another embodiment, the front-end and back-end applications 202 and 204 comprise separate applications configured for installation and execution on a same computer and/or different computers, wherein the different computers preferably are communicatively linked such that the front-end application 202 can communicate with the back-end application 204.

With the above described embodiments of the system 200 in mind, FIGS. 15 and 16 respectively illustrate non-limiting functional embodiments of the front-end application 202 and the back-end application 204. Beginning with the front-end application 202 as illustrated in FIG. 15, one sees that it (functionally) comprises a user interface 220, a system specification generator 222, and a back-end application interface 224.

In operation, the user interface 220 provides, for example, a graphical screen or sets of graphical screens allowing the user to input information for defining a given system specification 210, such as types, numbers, names, links, and other configuration settings for a selected set of sensor components corresponding to the sensor components defined in the toolset 12. Of course, the front-end application 204 generally includes functions for saving this input in the form of files or in some other retrievable format, and such information can be saved collectively for different back-end applications 204, or separately for each of one or more back-end applications 204. (In such cases, the different back-end applications generally have different logical names and/or are selectable using different network addresses.)

In any case, the system specification generator 222 generates system specifications 210 from the user input received via the user interface 220, and can include functionality for packing/unpacking system specifications 210. In any case, the back-end application interface 224 transfers system specifications 210 (packed or otherwise) to a targeted back-end application 204.

Where the front-end application 202 and the back-end application 204 are integrated together, the back-end application interface 224 may be an internal, purely logical transfer function, that makes the system specifications 210 (or their corresponding memory-held data structures) available for processing by the program code comprising the back-end application 204. However, in other embodiments, such as where the front-end and back-end applications 202 and 204 are configured for installation on separate computers (if desired), the back-end application interface 224 may comprise a more full-featured network communication function, which may support TCP/IP communications with one or more back-end applications 204. Indeed, in at least one embodiment, the front-end and back-end applications 202 and 204 use server and/or client components 64 and/or 66 instantiated from the toolset 12 to carry out intercommunication between them.

Turning to FIG. 16, one sees a non-limiting embodiment of the back-end application 204, which complements the previously described front-end application 202. In the illustrated embodiment, the back-end application 204 comprises a front-end application interface 230 for communicating with the front-end application 202, e.g., for receiving system specifications 210 and other related or supporting information, a specification processor 232 for processing system specifications 210, which can include functionality for packing/unpacking system specifications 210. The back-end application 204 further comprises a system generator 234 for generating component-based software systems 212 from corresponding system specifications 210. To that end, the back-end application 204 provides a run-time environment 236, in which it dynamically builds and runs one or more component-based software systems 212 in accordance with one or more corresponding system specifications 210.

Figure 17:
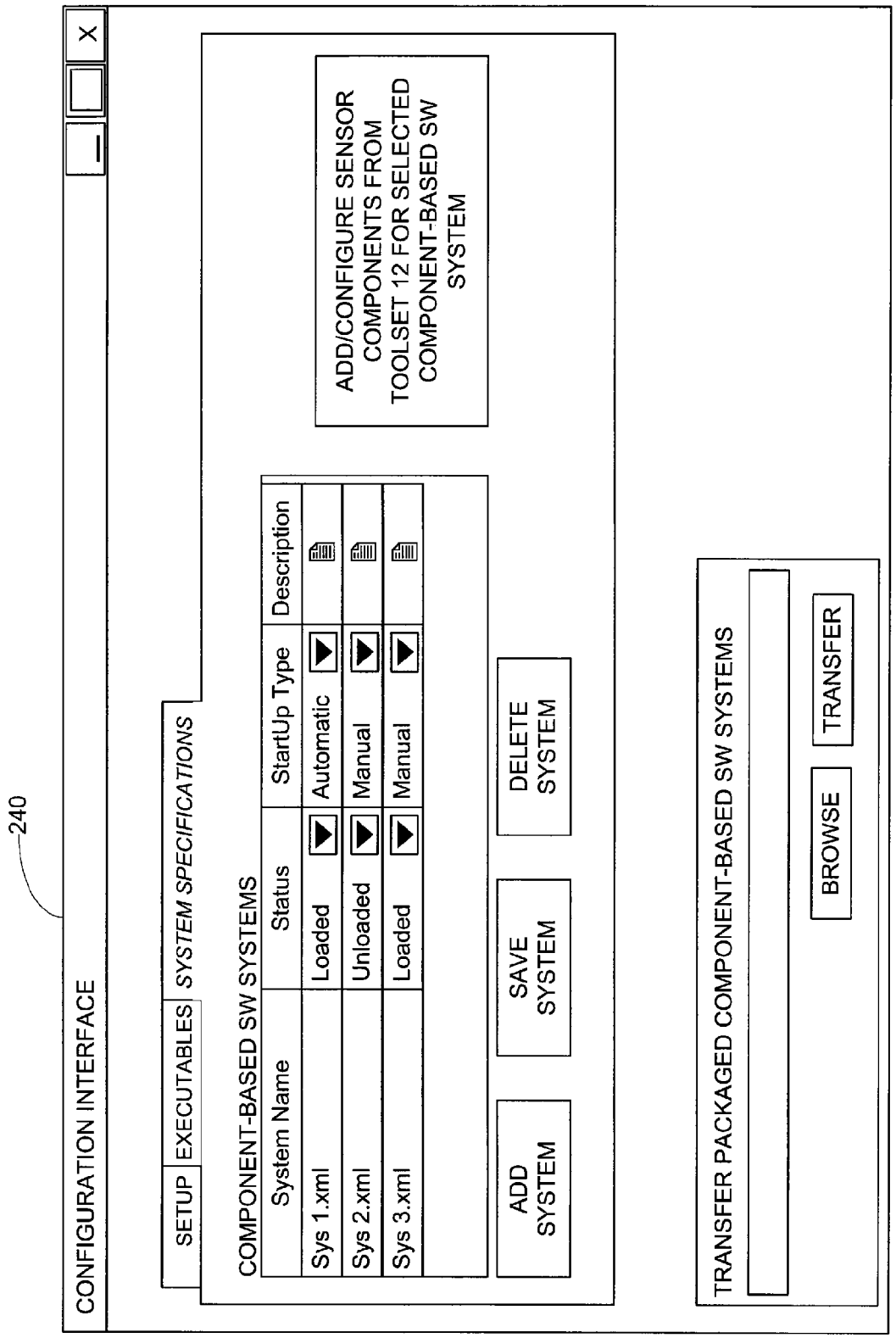
FIG. 17 is a diagram of a graphical user interface screen in one embodiment of the front-end application, wherein screen elements and controls enable building/selecting system specifications for transfer to a back-end application for component-based software system generation therefrom.

In one or more embodiments, a user defines system specifications 210 for desired component-based software systems 212 using a configuration screen 240, shown in one embodiment in FIG. 17, which may be provided on a computer monitor by program code included in the front-end application 202. The illustrated configuration screen 240 provides control inputs for adding/configuring system specifications corresponding to desired component-based software systems 212, and further includes a listing of component-based software systems 212 defined by existing system specifications, and the status of those systems 212, in terms of whether they are loaded or unloaded in the run-time environment 236 of a targeted back-end application 204, and whether they are set for manual or automatic loading/re-loading into the run-time environment 236 of the targeted back-end application 204.

Notably, the configuration screen 240 thus allows a user to browse existing system specifications 210, create new system specifications 210, and correspondingly transfer new or updated system specifications 210 to the currently targeted back-end application 204. In that manner, the user can add or modify the component-based software systems 212 being run by the targeted back-end application 204. Moreover, the configuration screen 240 allows the user to "see" the component-based software systems 212 resident at the targeted back-end application 204, and to load (activate) and unload (deactivate) them as needed or desired.

Thus, it should be understood that the one or more embodiments of the screen depict a hybrid design-time/run-time context, wherein the user uses the screen to design system specifications 210 for new desired component-based software systems 212 to be subsequently built and run at the back-end application 204. However, the screen also allows the user a live view of the component-based software systems 212 existent at the targeted back-end application 204, and allows the user to activate, deactivate, and/or modify those preexisting component-based software systems 212 as needed or desired.

Further, while the depicted screen 240 depicts advantageous controls for building, managing, and transferring system specifications 210 to one or more back-end applications 204, it should be understood that in at least one embodiment other mechanisms exist for building system specifications 210. For example, IDEs may be used to create system specifications 210, e.g., the IDE-based embodiment of the toolset 12 may provide the ability to create and edit system specifications 210. Also, in at least one embodiment, system specifications 210 can be generated using a text editor or like tool. (Of course, in any of these or other embodiments described herein, the back-end application 204 may include functionality to validate or otherwise authenticate received system specifications 210, such as by confirming sender identity, checking security codes or keys, etc. Additionally or alternatively, one or more embodiments of the back-end application require secure log-in or the like, to thereby restrict the transfer of component-based software systems 212 and/or other configuration information.)

FIG. 18 illustrates another embodiment of the configuration screen 240, which may be tabbed or otherwise segregated to allow the user to see different screen information at different times. In any case, FIG. 18 illustrates a configuration interface related to the management of executable programs, e.g., software processes, by the back-end application 204.

Using the illustrated screen, a user can identify executable programs to be managed by the back-end application 204 within its run-time environment 236—e.g., the screen provides controls for browsing and selecting executable programs and displays a listing of identified executable programs. Further, the screen provides controls allowing the user to specify whether each executable program should be started or stopped by the back-end application 204, and whether the executable program should be automatically restarted, e.g., at reboot. Still further, the screen provides controls for the user to transfer the identified executable programs to the back-end application 204.

More particularly, the illustrated screen controls allow a user to specify executables to be managed by the back-end application 204, and further allows the user to specify whether individual ones of those executables be manually or automatically started, and whether they should manually or automatically stopped. (With manual stoppage, the given executable continues running after the back-end application 204 terminates; with automatic stoppage, the back-end application 204 terminates the given executable as part of shutting down.) Note, too, that the screen controls allow the user to specify command parameters to be associated with corresponding ones of the listed executables, thereby allowing the user to specify, for example, run-time parameters to be passed to the executable by the back-end application 204 as part of initiating it.

It should be understood that the one or more embodiments of the screen 240 depict a hybrid design-time/run-time context, wherein the user uses the screen to identify executable programs of interest and (if needed) to transfer them to the targeted back-end application 204. However, the screen also allows the user a live view of the executable programs currently being managed in the run-time environment 236 of the targeted back-end application 204, and allows the user to start, stop, and/or auto-start those existing executable programs as needed or desired.

By way of non-limiting example, an executable program of interest may be a serial port monitoring program, or other hardware port monitoring program, capable of acting as data source for one or more component-based software systems 212. As such, the user can use the front-end application 202 to identify the monitoring program and transfer it to the back-end application 204, and can use the front-end application 202 to generate a given system specification 210 that defines one or more sensor components that link to the monitoring program as a data source. As such, the back-end application 204 correspondingly loads/executes the monitoring program, and the component-based software system 212 dynamically built from the given system specification 210 will functionally link to the monitoring program during live operation within the run-time environment 236.

Figure 19:
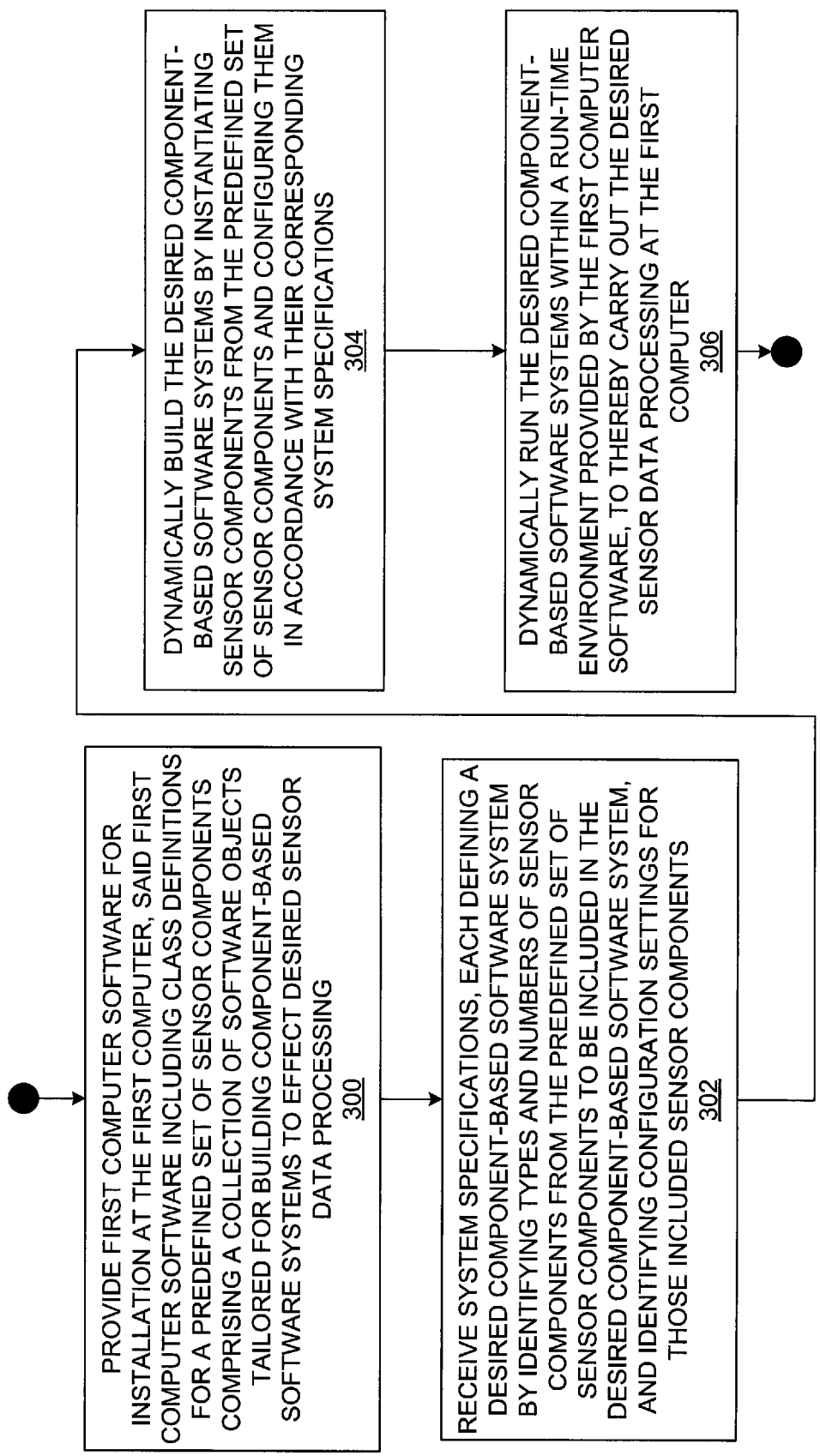
FIG. 19 is a logic flow diagram for one embodiment of processing logic implementing a method of deploying component-based software systems for the implementation of desired sensor data processing at a first computer.

Broadly, then, those skilled in the art will appreciate that the system 200 in any of its various embodiments supports a method of deploying component-based software systems 212 for the implementation of desired sensor data processing at a first computer. FIG. 19 illustrates one embodiment of the method, which comprises providing first computer software for installation at the first computer (Step 300). This first computer software includes class definitions for a predefined set of sensor components comprising a collection of software objects tailored for building component-based software systems 212 to effect desired sensor data processing, e.g., the software includes the toolset 12.

The method further includes configuring the first computer software such that it is operative during execution to receive system specifications 210 (Step 302). Each system specification 210 defines a desired component-based software system 212 by identifying types and numbers of sensor components from the predefined set of sensor components to be included in the desired component-based software system 212, and by identifying configuration settings for those included sensor components.

The method further includes configuring the first computer software such that it is operative during execution to dynamically build the desired component-based software systems 212 by instantiating sensor components from the predefined set of sensor components and configuring them in accordance with their corresponding system specifications (Step 304), and to dynamically run the desired component-based software systems 212 within a run-time environment provided by the first computer software (Step 306). In so doing, the first computer software thereby carries out the desired sensor data processing at the first computer.

In at least one embodiment, the method further includes providing second computer software that is operative during execution to provide a user interface enabling a user to define the system specifications 210 based on the user selecting sensor components from the predefined set of sensor components and configuring the selected sensor components in accordance with the desired sensor data processing to be carried out at the first computer. As such, the method may further include configuring the second computer software such that a user at a remote computer having a communication link with the first computer can define the system specifications 210 for the desired component-based software systems 212 to be built and run by the first computer software at the first computer. In at least one embodiment, that comprises implementing the second computer software as separately installable software for installation at the remote computer, such that the user of the remote computer can define the system specifications for transfer to the first computer.

In such embodiments, the method may include configuring the second computer software such that a user at a remote computer having a communication link with the first computer can define the system specifications 210 for the desired component-based software systems 212 to be built and run by the first computer software at the first computer based on implementing the second computer software as a web browser interface for the first computer software. With that implementation, the user of the remote computer defines the system specifications 212 via the web browser interface.

Broadly, then, the above method may be implemented in computer readable media storing a first computer program for rapidly implementing desired sensor data processing at a target computer. The first computer program is intended for installation and execution by the target computer and comprises class definitions for a predefined set of sensor components comprising a collection of software objects specially tailored for sensor data processing. The first computer program further comprises program code operative to dynamically process system specifications 21, each system specification 210 identifying types, numbers, and configurations of sensor components from the predefined set of sensor components to be included in a desired component-based software system 212. The first computer program further comprises program code operative to provide a run-time environment 236 for dynamically building and running the desired component-based software systems 212 at the target computer, each desired component-based software system 212 carrying out all or part of the desired sensor data processing at the target computer.

The first computer program may further comprises program code operative to provide a user interface enabling a user to define new system specifications 210 as needed or desired, such that during execution of the first computer program by the target computer, a user having local or remote access to the target computer can cause the first computer program to process the new system specifications 210 and dynamically build and run the corresponding new component-based software systems 212. Such program code also may be operative to enable the user to inspect and modify preexisting system specifications 210, such that during execution of the first computer program by the target computer, a user having local or remote access to the target computer can cause the first computer program to process modified system specifications 210 and dynamically update the corresponding preexisting component-based software systems 212.

Of course, as noted, there may be a second computer program—such as in one or more embodiments of the front-end application 202—that is installable at a remote computer having a communication link with the target computer. The second computer program comprises program code operative to provide a user interface enabling a user of the remote computer to define new system specifications 210 and transfer them to the target computer, such that during execution of the first computer program by the target computer, the user of the remote computer can cause the first computer program to process the new system specifications 210 and dynamically build and run the corresponding new component-based software systems 212. Such processing also encompasses the modification of existing system specifications 210 and the updating of corresponding existing component-based software systems 212.

That is, the first or second computer software includes program code operative to provide a user interface enabling a user of the remote computer to inspect and modify preexisting system specifications 210, such that during execution of the first computer program by the target computer, the user of the remote computer can cause the target computer program to process modified versions of the preexisting system specifications 210 and dynamically update the corresponding preexisting component-based software systems 212.

Further, the program code operative to transfer system specifications 210 to the target computer may comprise program code to package the system specifications 210 together or individually, and to transfer the packaged system specifications 210 over the communication link to the target computer. In at least one embodiment, the program code to package the system specifications 210 comprises program code to generate extensible Markup Language (XML) files from the system specifications 210, including metadata and data identifying the selected sensor components and their corresponding definitions.

In at least one embodiment, the first computer program further comprises program code to receive packaged system specifications 210 via a communication link, wherein the packaged system specifications 210 represent remotely generated system specifications 210 that were packaged for transfer over the communication link, and further comprising program code to un-pack the packaged system specifications 210 for processing. Such program code may comprise instructions to parse metadata and data contained in XML files representing packaged system specifications 210.

With the above in mind, those skilled in the art will appreciate that the present invention is limited only by the following claims and their legal equivalents.

What is claimed is:

1. A method of deploying component-based software systems for the implementation of desired sensor data processing at a first computer, the method comprising:

providing first computer software for installation at the first computer, said first computer software including class definitions for a predefined set of sensor components comprising a collection of software objects tailored for building component-based software systems to effect desired sensor data processing;

said first computer software operative during execution to:
receive system specifications, each defining a desired component-based software system by identifying types and numbers of sensor components from the predefined set of sensor components to be included in the desired component-based software system, and identifying configuration settings for those included sensor components; and dynamically build the desired component-based software systems by instantiating sensor components from the predefined set of sensor components and configuring them in accordance with their corresponding system specifications; and dynamically run the desired component-based software systems within a run-time environment provided by the first computer software, to thereby carry out the desired sensor data processing at the first computer.

2. The method of claim 1, further comprising providing second computer software that is operative during execution to provide a user interface enabling a user to define the system specifications based on the user selecting sensor components from the predefined set of sensor components and configuring the selected sensor components in accordance with the desired sensor data processing to be carried out at the first computer.

3. The method of claim 2, further comprising configuring the second computer software such that a user at a remote computer having a communication link with the first computer can define the system specifications for the desired component-based software systems to be built and run by the first computer software at the first computer.

4. The method of claim 3, wherein configuring the second computer software such that a user at a remote computer having a communication link with the first computer can define the system specifications for the desired component-based software systems to be built and run by the first computer software at the first computer comprises implementing the second computer software as separately installable software for installation at the remote computer, such that the user of the remote computer can define the system specifications for transfer to the first computer.

5. The method of claim 3, wherein configuring the second computer software such that a user at a remote computer having a communication link with the first computer can define the system specifications for the desired component-based software systems to be built and run by the first computer software at the first computer comprises implementing the second computer software as a web browser interface for the first computer software, such that the user of the remote computer defines the system specifications via the web browser interface.

6. A system, stored in one or more computer-readable mediums, for deploying component-based software systems for the implementation of desired sensor data process flows, the system comprising:

a front-end application operative to generate system specifications from user input, each system specification defining a desired component-based software system of one or more sensor components and their corresponding configurations in accordance with sensor component class definitions for a predefined set of sensor components that are tailored for building sensor data process flows; and a back-end application operative to store the sensor component class definitions for use in instantiating sensor components as needed, receive system specifications, and dynamically build and run the corresponding desired component-based software systems within a run-time environment provided by the back-end application.

7. The system of claim 6, wherein the front-end application is operative to store system specifications for recall, inspection, and modification by a user.

8. The system of claim 7, wherein the back-end application is operative to dynamically update an existing component-based software system running within its run-time environment responsive to receiving a modified system specification for the existing component-based software system.

9. The system of claim 6, wherein the front-end application is operative to define functional associations between sensor components in a desired component-based software system and external executable programs callable within the run-time environment of the back-end application and identify any such functionally associated external executable programs to the back-end application.

10. The system of claim 9, wherein the back-end application is operative to initiate or call the functionally associated external executable programs as identified by the front-end application, such that one or more external executable programs can be executed to support operation of the component-based software systems running within the run-time environment of the back-end application.

11. The system of claim 6, wherein the front-end application comprises a remote configuration interface accessible to a user via a computer network connection with a host computer running the back-end application.

12. The system of claim 6, wherein the front-end and back-end applications comprise separate applications configured for installation and execution on a same computer and on first and second computers, respectively, wherein the first and second computers are communicatively linked such that the front-end application can communicate with the back-end application.

13. The system of claim 12, wherein the front-end application is operative to communicate with the back-end application for transfer of system specifications from the first computer to the second computer, such that a user of the first computer system defines the system specifications for the desired component-based software systems and transfers them to the second computer, whereupon the back-end application dynamically builds and runs the desired component-based software systems.

14. The system of claim 6, wherein the front-end application is embodied on a first computer and the back-end application is embodied on a second computer, such that the system enables a user of the first computer to build and run desired component-based software systems on the second computer according to the system specifications generated at the first computer.

15. The system of claim 6, wherein the front-end application is operative to package the system specifications generated from the user input, and to transfer the packaged system specifications to the back-end application, and wherein the back-end application is configured to un-package each packaged system specification received from the front-end application, and to build and run the corresponding desired component-based software systems from the un-packaged system specifications.

16. The system of claim 15, wherein the front-end application is operative to package system specifications by serializing them into eXtensible Markup Language (XML) files, and wherein the back-end application is operative to un-package packaged system specifications by parsing metadata and corresponding data from the XML files.

17. The system of claim 6, wherein the back-end application is operative to transfer system specifications to another, like back-end application, such that one back-end application executing on a first computer can share systems specifications with another back-end application executing on a second computer.

18. A computer readable media storing a first computer program for rapidly implementing desired sensor data processing at a target computer, the first computer program for installation and execution by the target computer and comprising:

class definitions for a predefined set of sensor components comprising a collection of software objects specially tailored for sensor data processing;

program code operative to dynamically process system specifications, each system specification identifying types, numbers, and configurations of sensor components from the predefined set of sensor components to be included in a desired component-based software system; and program code operative to provide a run-time environment for dynamically building and running the desired component-based software systems at the target computer, each desired component-based software system carrying out all or part of the desired sensor data processing at the target computer.

19. The computer readable media of claim 18, wherein the first computer program further comprises program code operative to provide a user interface enabling a user to define new system specifications as needed or desired, such that during execution of the first computer program by the target computer, a user having local or remote access to the target computer can cause the first computer program to process the new system specifications and dynamically build and run the corresponding new component-based software systems.

20. The computer readable media of claim 18, wherein the program code operative to provide a user interface enabling a user to define new system specifications as needed or desired is further operative to enable the user to inspect and modify preexisting system specifications, such that during execution of the first computer program by the target computer, a user having local or remote access to the target computer can cause the first computer program to process modified system specifications and dynamically update the corresponding preexisting component-based software systems.

21. The computer readable media of claim 18, further comprising a second computer program installable at a remote computer having a communication link with the target computer, said second computer program comprising program code operative to provide a user interface enabling a user of the remote computer to define new system specifications and transfer them to the target computer, such that during execution of the first computer program by the target computer, the user of the remote computer can cause the first computer program to process the new system specifications and dynamically build and run the corresponding new component-based software systems.

22. The computer readable media of claim 21, wherein the program code operative to transfer system specifications to the target computer comprises program code to package the system specifications together or individually, and to transfer the packaged system specifications over the communication link to the target computer.

23. The computer readable media of claim 22, wherein the program code to package the system specifications comprises program code to generate eXtensible Markup Language (XML) files from the system specifications, including metadata and data identifying the selected sensor components and their corresponding definitions.

24. The computer readable media of claim 18, wherein the program code operative to provide a user interface enabling a user of the remote computer to define new system specifications and transfer them to the target computer is further operative to enable the user to inspect and modify preexisting system specifications, such that during execution of the first computer program by the target computer, the user of the remote computer can cause the target computer program to process modified versions of the preexisting system specifications and dynamically update the corresponding preexisting component-based software systems.

25. The computer readable media of claim 18, wherein the first computer program further comprises program code to receive packaged system specifications via a communication link, wherein the packaged system specifications represent remotely generated system specifications that were packaged for transfer over the communication link, and further comprising program code to un-package the packaged system specifications for processing.

26. The computer readable media of claim 25, wherein the packaged system specifications comprise eXtensible Markup Language (XML) files, and wherein the program code to un-package the packaged system specifications comprises program code to parse metadata and data contained in the XML files.

27. The computer readable media of claim 26, wherein the first computer program further comprises program code to transfer a received packaged component-based software system to another target computer, such that target computers executing copies of the first computer program can transfer and share system specifications.

28. The computer readable media of claim 18, wherein the first computer program further comprises program code to package any given system specification existent at the target computer for transfer to another target computer.

29. The computer readable media of claim 28, wherein the program code to package any given system specification existent at the target computer for transfer to another target computer includes program code to generate an eXtensible Markup Language (XML) file representing the given system specification, and program code for communicating the XML file to the other target computer over a communication link.

30. The computer readable media of claim 18, wherein the first computer program includes program code to manage executable files within its run-time environment, according to a listing that identifies particular executable files of interest, wherein the particular executable files of interest support the desired sensor data processing to be carried out by the target computer.

31. The computer readable media of claim 18, wherein the predefined set of sensor components comprises data source components operative to obtain sensor data, data series components operative to collect sensor data from data source components, data field components to control the collection of sensor data by data series components, and sensor system components operative to contain a related collection of data source, data series, and data field components.

32. A computer system for deploying component-based software systems for the implementation of desired sensor data process flows, the computer system comprising:

a first computer comprising memory to store a front-end application and a processor to execute the front-end application, said front-end operative to generate system specifications from user input, each system specification defining a desired component-based software system of one or more sensor components and their corresponding configurations in accordance with sensor component class definitions for a predefined set of sensor components that are tailored for building sensor data process flows; and a second computer comprising memory to store a back-end application and a processor to execute the back-end application, said back-end application operative to store the sensor component class definitions for use in instantiating sensor components as needed, receive system specifications, and dynamically build and run the corresponding desired component-based software systems within a run-time environment provided by the back-end application.

33. The computer system of claim 32, wherein the first and second computers are communicatively coupled together via one or more computer networks.

* * * * *